(12) United States Patent
Ye et al.

(10) Patent No.: US 12,107,766 B2
(45) Date of Patent: Oct. 1, 2024

(54) NETWORK CONGESTION HANDLING METHOD, MODEL UPDATE METHOD, AND RELATED APPARATUS

(71) Applicant: Huawei Technologies Co., Ltd., Shenzhen (CN)

(72) Inventors: Haonan Ye, Nanjing (CN); Huafeng Wen, Nanjing (CN); Liang Zhang, Nanjing (CN); Ke Meng, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 323 days.

(21) Appl. No.: 17/695,540

(22) Filed: Mar. 15, 2022

(65) Prior Publication Data

US 2022/0200906 A1    Jun. 23, 2022

Related U.S. Application Data

(63) Continuation of application No. PCT/CN2020/115164, filed on Sep. 14, 2020.

(30) Foreign Application Priority Data

Sep. 16, 2019 (CN) .......................... 201910872469.7

(51) Int. Cl.
*H04L 47/11* (2022.01)
*H04L 41/14* (2022.01)
*H04L 43/062* (2022.01)
*H04L 47/127* (2022.01)

(52) U.S. Cl.
CPC ............ *H04L 47/11* (2013.01); *H04L 41/145* (2013.01); *H04L 43/062* (2013.01); *H04L 47/127* (2013.01)

(58) Field of Classification Search
CPC ...... H04L 47/11; H04L 47/127; H04L 47/115; H04L 47/12; H04L 47/26; H04L 47/29; H04L 47/25; H04L 47/263; H04L 47/31; H04L 43/062
See application file for complete search history.

(56) References Cited

U.S. PATENT DOCUMENTS

| 2008/0239953 | A1 | 10/2008 | Bai et al. |
| 2015/0029887 | A1 | 1/2015 | Briscoe et al. |
| 2016/0323782 | A1 | 11/2016 | Baillargeon et al. |
| 2017/0295100 | A1 | 10/2017 | Hira et al. |
| 2019/0068502 | A1* | 2/2019 | Shiraki .................. H04L 47/12 |

(Continued)

FOREIGN PATENT DOCUMENTS

| CN | 104412648 A | 3/2015 |
| CN | 105024946 A | 11/2015 |
| CN | 108259383 A | 7/2018 |

(Continued)

*Primary Examiner* — Jamal Javaid
(74) *Attorney, Agent, or Firm* — Conley Rose, P.C.

(57) ABSTRACT

A network congestion handling method includes obtaining network status information; determining, based on the network status information and an Explicit Congestion Notification (ECN) optimization model, a reference probability corresponding to recommended ECN configuration information; determining destination ECN configuration information based on the reference probability; and performing ECN marking on a packet by using the destination ECN configuration information.

20 Claims, 10 Drawing Sheets

(56) References Cited

U.S. PATENT DOCUMENTS

2019/0089644 A1   3/2019  Shpiner et al.

FOREIGN PATENT DOCUMENTS

| CN | 108304435 A | 7/2018 |
| CN | 109446885 A | 3/2019 |
| CN | 110061927 A | 7/2019 |
| CN | 110198180 A | 9/2019 |
| JP | 2011188429 A | 9/2011 |
| JP | 2017513247 A | 5/2017 |
| JP | 2019047254 A | 3/2019 |
| JP | 2019514294 A | 5/2019 |
| JP | 2019153937 A | 9/2019 |
| WO | 2013132213 A1 | 9/2013 |
| WO | 2017199208 A1 | 11/2017 |

* cited by examiner

NETWORK CONGESTION HANDLING METHOD, MODEL UPDATE METHOD, AND RELATED APPARATUS

CROSS-REFERENCE TO RELATED APPLICATIONS

This is a continuation of International Patent Application No. PCT/CN2020/115164 filed on Sep. 14, 2020, which claims priority to Chinese Patent Application No. 201910872469.7 filed on Sep. 16, 2019. The disclosures of the aforementioned applications are hereby incorporated by reference in their entireties.

TECHNICAL FIELD

This application relates to the field of communication technologies, and in particular, to a network congestion handling method, a model update method, and a related apparatus.

BACKGROUND

In the big data era, a plurality of large-scale internet enterprises build a plurality of data centers around the world, to provide services with higher quality for users. Network congestion is a common problem in the data center. An insufficient capability of a network device or a transient traffic burst usually causes network congestion.

A cache of a network device in the data center is small. Therefore, once severe network congestion occurs, the network device directly discards a data packet. Consequently, this causes a high delay of a service, affects real-time performance of an application, and degrades user experience.

SUMMARY

This application provides a network congestion handling method, a model update method, and related apparatus, to improve operating efficiency of a network device.

According to a first aspect, an embodiment of this application provides a network congestion control method, including obtaining network status information, determining, based on the network status information and an Explicit Congestion Notification (ECN) optimization model, a reference probability corresponding to recommended ECN configuration information, determining destination ECN configuration information based on the reference probability, and performing ECN marking on a packet by using the destination ECN configuration information.

Based on the foregoing technical solution, the ECN optimization model may determine the recommended ECN configuration information based on the network status information that can reflect a network operating status, and a network device may determine the finally used destination ECN configuration information based on the recommended ECN configuration information determined by the ECN optimization model. In the foregoing technical solution, the destination ECN configuration information finally used by the network device is applicable to a current operating environment of the network device. This improves operating efficiency of the network device, and improves performance of the network device and user experience.

In a possible design, determining destination ECN configuration information based on the reference probability includes determining whether the recommended ECN configuration information is trustworthy based on the reference probability, and if the recommended ECN configuration information is trustworthy, determining that the recommended ECN configuration information is the destination ECN configuration information, or if the recommended ECN configuration information is not trustworthy, determining that reference ECN configuration information is the destination ECN configuration information.

In the foregoing technical solution, when the ECN configuration information recommended by the ECN optimization model is not applicable to the current operating environment, other ECN configuration information may be used for flow control.

In a possible design, before determining destination ECN configuration information based on the reference probability, the method further includes determining the reference ECN configuration information based on the network status information.

In the foregoing technical solution, the ECN configuration information used for flow control may be determined based on a heuristic learning procedure, so that the ECN configuration information can be adapted to the current network environment.

In a possible design, the method further includes sending the network status information and the reference ECN configuration information to a network analysis device, receiving model update information from the network analysis device, and updating the ECN optimization model based on the model update information.

The network status information is related to the current operating environment, and the reference ECN configuration information is ECN configuration information adapted to the current operating environment. Therefore, in the foregoing technical solution, the network status information and the reference ECN configuration information are reported, so that the network analysis device can adjust the ECN optimization model by using a parameter of an actual operating environment. In this way, the ECN optimization model can be more adapted to the actual network environment of the network device, to improve trustworthiness of the ECN configuration information recommended by the ECN optimization model.

In a possible design, the reference probability includes M probability values, M is a positive integer greater than or equal to 2, and determining whether the recommended ECN configuration information is trustworthy based on the reference probability includes determining whether a target probability value in the M probability values is greater than a first preset threshold, where the target probability value is a maximum value in the M probability values, and if the target probability value is greater than or equal to the first preset threshold, determining that the recommended ECN configuration information is trustworthy, or if the target probability value is less than the first preset threshold, determining that the recommended ECN configuration information is not trustworthy.

In a possible design, the reference probability includes M probability values, and determining whether the recommended ECN configuration information is trustworthy based on the reference probability includes determining whether a fluctuation coefficient of maximum N probability values in the M probability values is greater than a second preset threshold, where N is a positive integer greater than or equal to 2 and less than M, and M is a positive integer greater than N, and if the fluctuation coefficient of the N probability values is greater than or equal to the second preset threshold, determining that the recommended ECN configuration information is trustworthy, or if the fluctuation coefficient of the N probability values is less than the second preset threshold, determining that the recommended ECN configuration information is not trustworthy, where the fluctuation coefficient of the N probability values is determined according to the following formula:

$$P_N = \frac{std(P_{topN})}{mean(P_{topN})},$$

where $P_N$ indicates the fluctuation coefficient of the N probability values, $P_{topN}$ indicates the N probability values, mean indicates a mean function, and std indicates a standard deviation function.

In a possible design, the network status information includes network traffic information and network congestion information, the network traffic information is used to indicate traffic of the network device, and the network congestion information is used to indicate a congestion status of the network device.

According to a second aspect, an embodiment of this application provides a model update method, including receiving P pieces of network status information and P pieces of ECN configuration information from a network device, where the P pieces of network status information are in a one-to-one correspondence with the P pieces of ECN configuration information, and P is a positive integer greater than or equal to 2, determining, based on the P pieces of network status information and the P pieces of ECN configuration information, model update information used to update an ECN optimization model, and sending the model update information to the network device.

The network status information is related to the current operating environment, and the reference ECN configuration information is ECN configuration information adapted to the current operating environment. Therefore, the ECN optimization model may be adjusted by using a parameter of an actual operating environment. In this way, the ECN optimization model can be more adapted to the actual network environment of the network device, to improve trustworthiness of ECN configuration information recommended by the ECN optimization model.

In a possible design, determining, based on the P pieces of network status information and the P pieces of ECN configuration information, model update information used to update an ECN optimization model includes determining Q ECN configuration information groups based on the P pieces of ECN configuration information, where a $q^{th}$ ECN configuration information group in the Q ECN configuration information groups includes $N_q$ pieces of ECN configuration information in the P pieces of ECN configuration information, sampling moments corresponding to the $N_q$ pieces of ECN configuration information are consecutive, the $N_q$ pieces of ECN configuration information converge at ECN configuration information q, q=1, ..., or Q, $N_q$ is a positive integer greater than or equal to 2, and a sum from $N_1$ to $N_q$ is P, determining Q training parameter groups, where a $q^{th}$ training parameter group in the Q training parameter groups includes $N_q$ pieces of network status information and the ECN configuration information q, and the $N_q$ pieces of network status information are in a one-to-one correspondence with the $N_q$ pieces of ECN configuration information, and determining the model update information based on the Q training parameter groups.

A heuristic learning procedure finally converges at fixed ECN configuration information. During this period, the ECN configuration information may change at any time and may not be applicable to the network operating environment. Therefore, in the foregoing technical solution, the converged ECN configuration information is used as a label of the network status information collected in a convergence process, to form a group of training parameters. In this way, the model update information obtained through training by using the group of training parameters is more accurate.

In a possible design, the P pieces of ECN configuration information are in a one-to-one correspondence with P consecutive sampling moments, and determining Q ECN configuration information groups based on the P pieces of ECN configuration information includes determining, based on two pieces of ECN configuration information in the P pieces of ECN configuration information, whether a second sampling moment in two consecutive sampling moments is a switching moment, where a first piece of ECN configuration information in the two pieces of ECN configuration information corresponds to a first sampling moment in the two consecutive sampling moments, and a second piece of ECN configuration information corresponds to the second sampling moment, and if the second sampling moment is not the switching moment, determining that the two pieces of ECN configuration information belong to a same ECN configuration information group, or if the second sampling moment is the switching moment, determining that the two pieces of ECN configuration information separately belong to two ECN configuration information groups.

The ECN configuration information reported by the network device may include a plurality of complete heuristic learning procedures. In the foregoing technical solution, time slicing may be performed on the P pieces of ECN configuration information, to determine ECN configuration information included in each heuristic learning procedure.

In a possible design, determining, based on two pieces of ECN configuration information in the P pieces of ECN configuration information, whether a second sampling moment in two consecutive sampling moments is a switching moment includes, if $|Param(t)-Param(t-1)| \times Sign(t-t_0-T) \geq mean(Param\_S)+e \times std(Param\_S)$, determining that the second sampling moment is the switching moment, otherwise determining that the second sampling moment is not the switching moment, where T is preset duration, Param(t) indicates the first piece of ECN configuration information, Param(t−1) indicates the second piece of ECN configuration information, t0 indicates a previous switching moment, Param_S indicates a sequence of ECN configuration information from the previous switching moment to the second sampling moment, Sign indicates a sign function, mean indicates a mean function, std indicates a standard deviation function, and e indicates a scaling factor.

According to a third aspect, an embodiment of this application provides an electronic apparatus. The electronic apparatus includes a unit configured to implement any possible implementation of the method design in the first aspect. The electronic apparatus may be a network device or a component used for a network device (for example, a chip or a circuit).

According to a fourth aspect, an embodiment of this application provides an electronic apparatus. The electronic apparatus includes a unit configured to implement any possible implementation of the method design in the second aspect. The electronic apparatus may be a network analysis device or a component used for a network analysis device (for example, a chip or a circuit).

According to a fifth aspect, an embodiment of this application provides a network device, including a transceiver and a processor. Optionally, the network device further includes a memory. The processor is configured to control the transceiver to send and receive a signal, the memory is configured to store a computer program, and the processor is configured to invoke and run the computer program in the memory, so that the network device performs the method in any possible implementation of the method design in the first aspect.

According to a sixth aspect, an embodiment of this application provides a network analysis device, including a transceiver and a processor. Optionally, the network analysis device further includes a memory. The processor is configured to control the transceiver to send and receive a signal, the memory is configured to store a computer program, and the processor is configured to invoke and run the computer program in the memory, so that the network analysis device performs the method in any possible implementation of the method design in the second aspect.

According to a seventh aspect, an embodiment of this application provides a communication system. The system includes the network device in the fifth aspect and the network analysis device in the sixth aspect.

According to an eighth aspect, an embodiment of this application provides an electronic apparatus. The electronic apparatus may be a network device configured to implement the method in the method design in the first aspect, or a chip disposed in a network device. The electronic apparatus includes a processor. The processor is coupled to a memory, and may be configured to execute instructions and/or program code in the memory, to implement the method in any possible implementation of the method design in the first aspect. Optionally, the electronic apparatus further includes the memory. Optionally, the electronic apparatus further includes a communication interface, and the processor is coupled to the communication interface.

When the electronic apparatus is a network device, the communication interface may be a transceiver or an input/output interface.

When the electronic apparatus is a chip disposed in a network device, the communication interface may be an input/output interface.

Optionally, the transceiver may be a transceiver circuit. Optionally, the input/output interface may be an input/output circuit.

According to a ninth aspect, an embodiment of this application provides an electronic apparatus. The electronic apparatus may be a network analysis device configured to implement the method in the method design in the second aspect, or a chip disposed in a network analysis device. The electronic apparatus includes a processor. The processor is coupled to a memory, and may be configured to execute instructions and/or program code in the memory, to implement the method in any possible implementation of the method design in the second aspect. Optionally, the electronic apparatus further includes the memory. Optionally, the electronic apparatus further includes a communication interface, and the processor is coupled to the communication interface.

When the electronic apparatus is a network analysis device, the communication interface may be a transceiver or an input/output interface.

When the electronic apparatus is a chip disposed in a network analysis device, the communication interface may be an input/output interface.

Optionally, the transceiver may be a transceiver circuit. Optionally, the input/output interface may be an input/output circuit.

According to a tenth aspect, an embodiment of this application provides a computer program product. The computer program product includes computer program code. When the computer program code is run on a computer, the computer is enabled to perform the method in any possible implementation of the method design in the first aspect.

According to an eleventh aspect, an embodiment of this application provides a computer program product. The computer program product includes computer program code. When the computer program code is run on a computer, the computer is enabled to perform the method in any possible implementation of the method design in the second aspect.

According to a twelfth aspect, an embodiment of this application provides a computer-readable medium. The computer-readable medium stores program code. When the computer program code is run on a computer, the computer is enabled to perform the method in any possible implementation of the method design in the first aspect.

According to a thirteenth aspect, an embodiment of this application provides a computer-readable medium. The computer-readable medium stores program code. When the computer program code is run on a computer, the computer is enabled to perform the method in any possible implementation of the method design in the second aspect.

DESCRIPTION OF EMBODIMENTS

Figure 1:
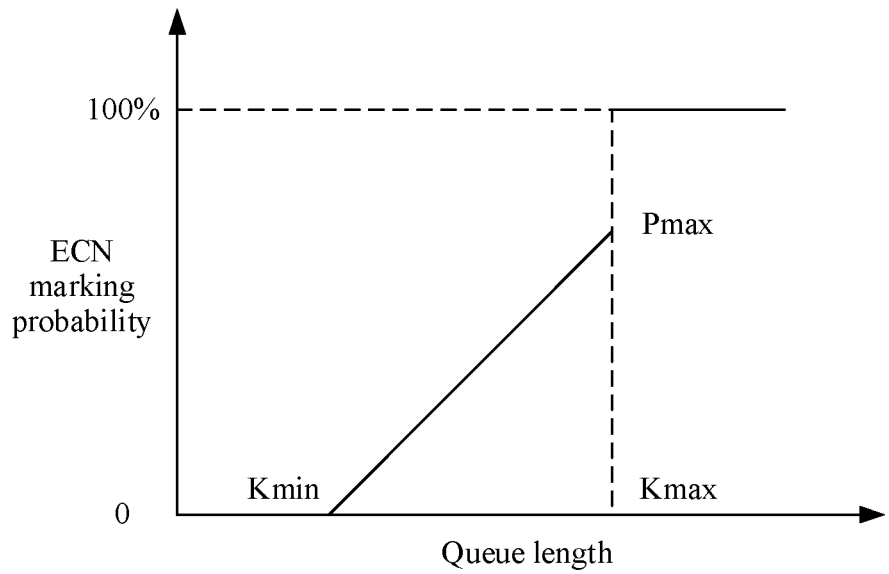
FIG. 1 shows a relationship between pieces of information in ECN configuration information.

The following describes technical solutions of this application with reference to the accompanying drawings.

In addition, in embodiments of this application, terms such as "for example" and "such as" are used to represent giving an example, an illustration, or description. Any embodiment or design scheme described as an "example" in this application should not be explained as being more preferred or having more advantages than another embodiment or design scheme. Further, the word "example" is used to present a concept in a specific manner.

In the embodiments of this application, "corresponding (relevant)" and "corresponding" may be interchangeably used sometimes. It should be noted that meanings expressed by the terms are consistent when differences are not emphasized.

In the embodiments of this application, sometimes a subscript such as $W_1$ may be written in an incorrect form such as W1. Expressed meanings are consistent when differences between them are not emphasized.

A network architecture and a service scenario that are described in the embodiments of this application are intended to describe the technical solutions in the embodiments of this application more clearly, and do not constitute a limitation on the technical solutions provided in the embodiments of this application. A person of ordinary skill in the art may learn that the technical solutions provided in the embodiments of this application are also applicable to a similar technical problem as the network architecture evolves and a new service scenario emerges.

Reference to "one embodiment" or "some embodiments" described in this specification or the like means that one or more embodiments of this application include a particular feature, structure, or characteristic described in combination with the embodiment. Thus, phrases "in one embodiment", "in some embodiments", "in some other embodiments", "in some additional embodiments", and the like that appear in different parts in this specification do not necessarily mean referring to a same embodiment, but mean "one or more embodiments, but not all embodiments", unless otherwise emphasized. Terms "include", "contain", and their variants all mean "include but are not limited to", unless otherwise emphasized.

In this application, "at least one" means one or more, and "a plurality of" means two or more. The term "and/or" describes an association relationship between associated objects and may indicate three relationships. For example, A and/or B may indicate the following cases: only A exists, both A and B exist, and only B exists, where A and B may be singular or plural. The character "/" generally represents an "or" relationship between the associated objects. "At least one of the following items (pieces)" or a similar expression thereof means any combination of the items, including any combination of one item (piece) or a plurality of items (pieces). For example, at least one of a, b, or c may indicate a, b, c, a-b, a-c, b-c, or a-b-c, where a, b, and c each may be singular or plural.

For ease of understanding the embodiments of this application, several terms used in this application are first briefly described.

1. ECN:

ECN is an extension to the Transmission Control Protocol (TCP)/Internet Protocol (IP). A network using the ECN can implement congestion control without discarding a packet.

Further, a switch or another device with a function of a switch adds an ECN mark to an IP header of a to-be-forwarded packet, to notify a receive end device that network congestion occurs. After receiving the packet including the ECN mark, the receive end device may determine that network congestion occurs on the switch, and send a response packet to a transmit end device. After receiving the response packet, the transmit end device may reduce a packet sending rate, to relieve congestion of the switch. Therefore, network congestion can be controlled without discarding a packet.

2. ECN Configuration Information:

A switch may perform ECN marking on a packet based on ECN configuration information. The ECN configuration information usually includes one or more of the following: an upper ECN threshold, a lower ECN threshold, and a maximum ECN marking probability. For ease of description, in the embodiments of this application, it is assumed that the ECN configuration information includes the upper ECN threshold, the lower ECN threshold, and the maximum ECN marking probability.

The upper ECN threshold may be denoted as Kmax. When a quantity of to-be-transmitted packets in a queue is greater than or equal to Kmax, the switch may mark the packets in the queue with a 100% probability. In other words, if a length of the queue is greater than or equal to Kmax, the switch marks each packet in the queue.

The lower ECN threshold may be denoted as Kmin. When a quantity of to-be-transmitted packets in a queue is less than or equal to Kmin, the switch may mark the packets in the queue with a 0% probability. In other words, if a length of the queue is less than or equal to Kmin, the switch does not mark any packet in the queue.

The maximum ECN marking probability may be denoted as Pmax. When a quantity of to-be-transmitted packets in a queue is greater than Kmin and less than Kmax, the switch may mark the packet in the queue with a P % probability, where P is a number greater than 0 and less than or equal to Pmax, and Pmax is less than 100%. As a length of the queue increases, the probability that the packets in the queue are marked by the switch increases, and the maximum ECN marking probability is a specified maximum value of a marking probability in the queue. In other words, if the length of the queue is greater than Kmin and less than Kmax, the switch marks P % of the packets in the queue, and a value of P may be positively correlated to the length of the queue.

A relationship between the upper ECN threshold, the lower ECN threshold, an ECN marking probability, and the maximum ECN marking probability may alternatively be shown in FIG. 1.

FIG. 1 shows a relationship between pieces of information in ECN configuration information.

As shown in FIG. 1, when a length of a queue is less than Kmin, the ECN marking probability is 0. When a length of a queue is greater than or equal to Kmax, the ECN marking probability is 100%. When a length of a queue is greater than Kmin and less than Kmax, the ECN marking probability is a value greater than 0 and less than Pmax.

That a switch performs ECN marking on a packet based on ECN configuration information may include, if a length of a queue is less than or equal to Kmin, the switch does not mark any packet in the queue, if a length of a queue is greater than or equal to Kmax, the switch marks each packet in the queue, or if a length of a queue is greater than Kmin and less than Kmax, the switch marks P % of the packets in the queue, where P is a number greater than 0 and less than or equal to Pmax, and Pmax is less than 100%. The switch may mark the packet in a random manner.

Figure 2:
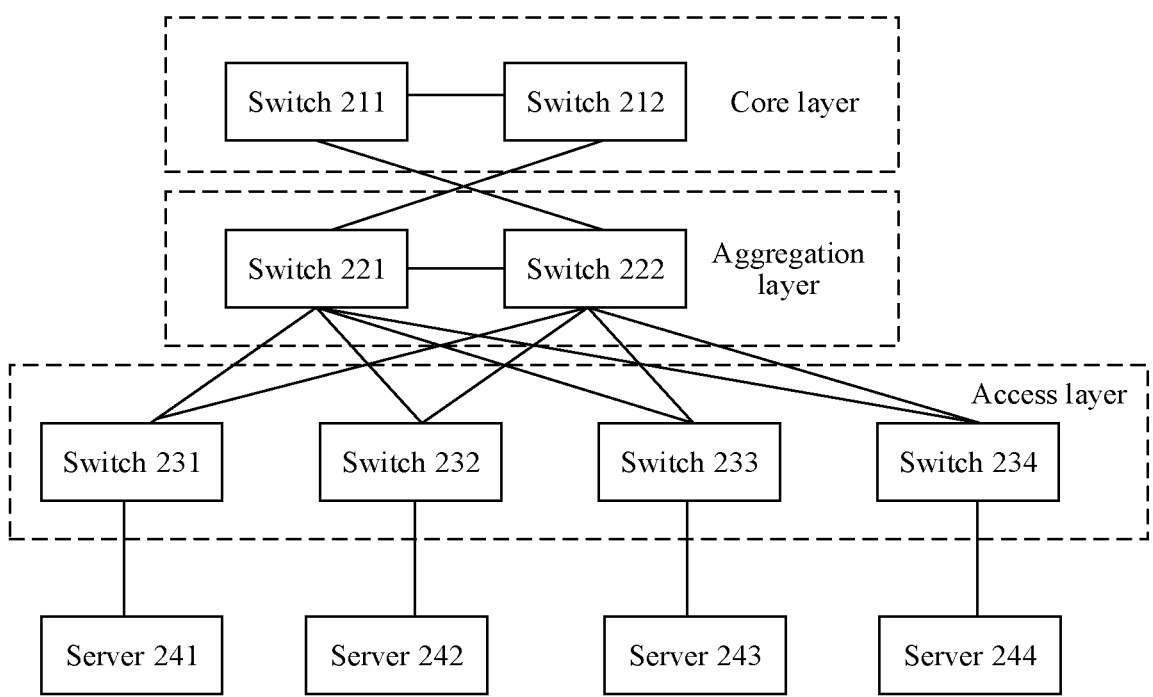
FIG. 2 is a schematic diagram of a structure of a data center network to which a technical solution of this application may be applied.

FIG. 2 is a schematic diagram of a structure of a data center network to which a technical solution of this application may be applied. The data center network shown in FIG. 2 is a three-layer data center network. The three layers are a core layer, an aggregation layer, and an access layer.

In the data center network shown in FIG. 2, the core layer includes a switch 211 and a switch 212, the aggregation layer includes a switch 221 and a switch 222, and the access layer includes a switch 231, a switch 232, a switch 233, and a switch 234. The switch 231 is connected to a server 241, the switch 232 is connected to a server 242, the switch 233 is connected to a server 243, and the switch 234 is connected to a server 244.

It may be understood that FIG. 2 only shows an example of a three-layer data center network, but does not constitute a limitation on a three-layer data center network. For example, the three-layer data center network may further include more switches and/or servers, or may include fewer switches and/or servers. In addition, a connection relationship between switches in the three-layer data center network and/or a connection relationship between a server and a switch may be another connection manner other than that shown in FIG. 2.

Figure 3:
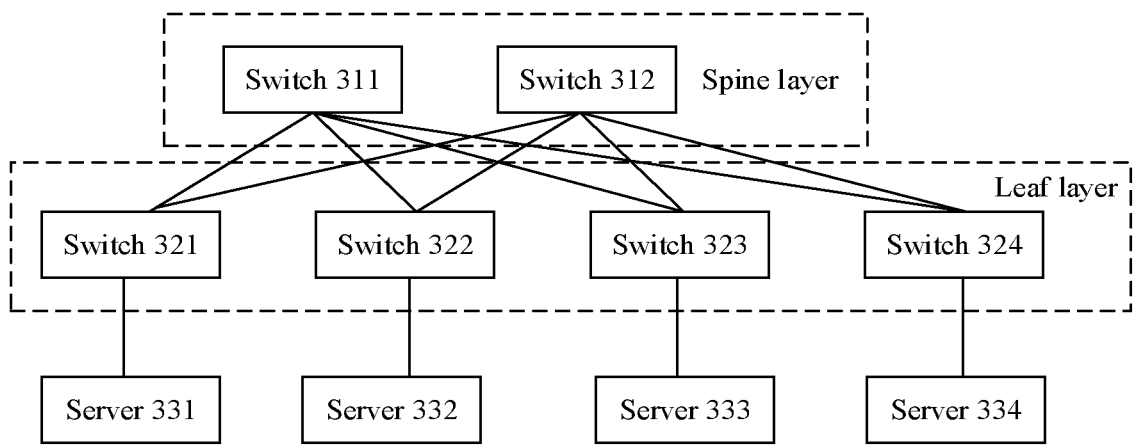
FIG. 3 is a schematic diagram of a structure of another data center network to which a technical solution of this application may be applied.

FIG. 3 is a schematic diagram of a structure of another data center network to which a technical solution of this application may be applied. The data center network shown in FIG. 3 is a two-layer data center network. The two layers are a spine layer and a leaf layer.

In the data center network shown in FIG. 3, the spine layer includes a switch 311 and a switch 312, and the leaf layer includes a switch 321, a switch 322, a switch 323, and a switch 324. The switch 321 is connected to a server 331, the switch 322 is connected to a server 332, the switch 323 is connected to a server 333, and the switch 324 is connected to a server 334.

It may be understood that FIG. 3 only shows an example of a two-layer data center network, but does not constitute a limitation on a two-layer data center network. For example, the two-layer data center network may further include more switches and/or servers, or may include fewer switches and/or servers. In addition, a connection relationship between switches in the two-layer data center network and/or a connection relationship between a server and a switch may be another connection manner other than that shown in FIG. 3.

Figure 4:
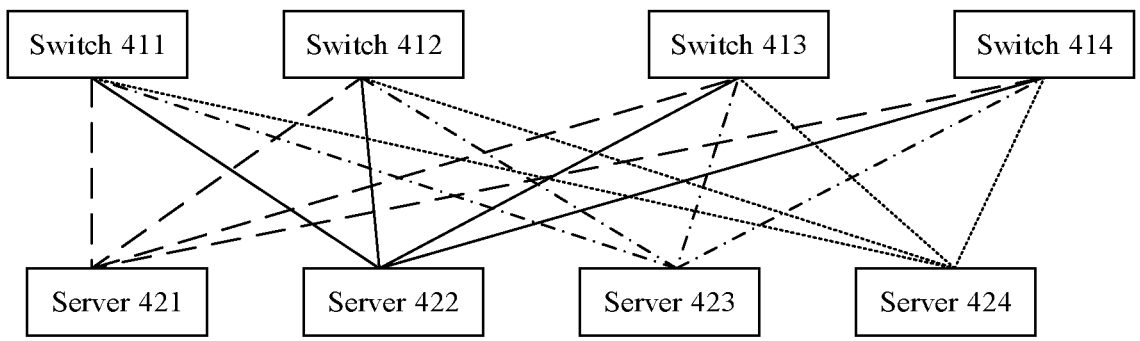
FIG. 4 is a schematic diagram of a structure of another data center network to which a technical solution of this application may be applied.

FIG. 4 is a schematic diagram of a structure of another data center network to which a technical solution of this application may be applied. The data center network shown in FIG. 4 is a single-layer data center network.

The data center network shown in FIG. 4 includes a switch 411, a switch 412, a switch 413, and a switch 414. As shown in FIG. 4, each switch in the data center network is connected to all servers. For example, the switch 411 is connected to a server 421, a server 422, a server 423, and a server 424. For another example, the switch 412 is connected to a server 421 to a server 424, the switch 413 is connected to a server 421 to a server 424, and the switch 414 is connected to a server 421 to a server 424.

Figure 5:
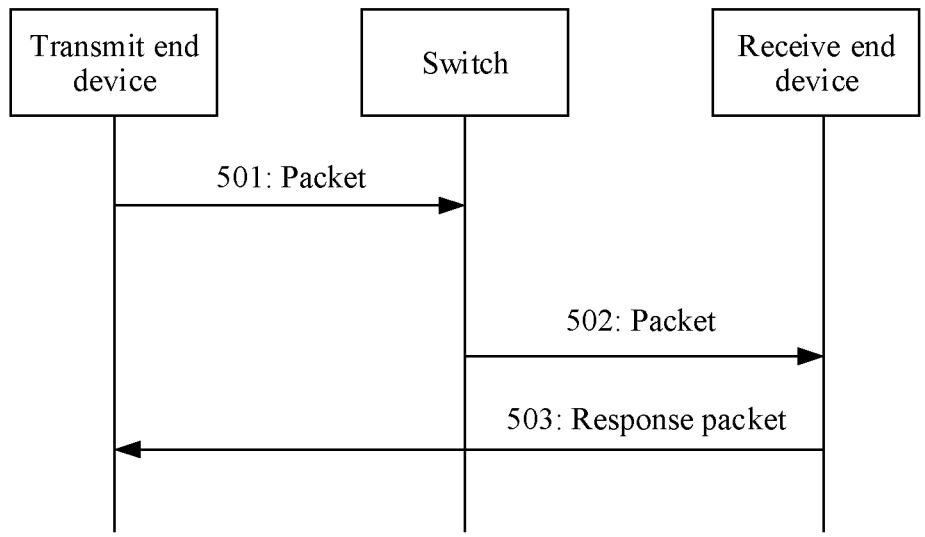
FIG. 5 is a schematic diagram of congestion control performed by using ECN.

FIG. 5 is a schematic diagram of congestion control performed by using ECN. A "switch" mentioned in FIG. 5 may be the switch in FIG. 2 to FIG. 4, a "transmit end device" mentioned in FIG. 5 may be a server in FIG. 2 to FIG. 4, and a "receive end device" mentioned in FIG. 5 may be a server in FIG. 2 to FIG. 4. It is clear that the transmit end device and the receive end device may alternatively be other devices that communicate by using one or more switches in FIG. 2 to FIG. 4.

501: A transmit end device sends a packet to a switch.

Correspondingly, the switch receives the packet from the transmit end device.

An IP header of the packet may include an ECN indication field. A value of the ECN indication field is used to indicate a negative value, that is, it indicates that no network congestion occurs. For example, if the value of the ECN indication field is 10 or 01, it indicates that no network congestion occurs.

502: The switch forwards the packet to a receive end device.

Correspondingly, the receive end device receives the packet from the switch.

If no network congestion occurs on the switch, or a length of a queue of the switch is less than or equal to Kmin, the switch may directly send the packet to the receive end device.

If network congestion occurs on the switch, and a length of a queue is greater than Kmin and less than Kmax, the switch performs ECN marking on the packet in the queue based on an ECN marking probability.

If network congestion occurs on the switch, and a length of a queue is greater than or equal to Kmax, the switch performs ECN marking on the packet.

It is assumed that the packet is a marked packet, the value of the ECN indication field in the IP header of the packet is used to indicate a positive value, that is, indicate that network congestion occurs. For example, if the value of the ECN indication field is 11, it indicates that network congestion occurs.

In other words, if the switch performs ECN marking on the packet, the switch updates the value of the ECN indication field in the IP header of the packet from 10 or 01 to 11.

For ease of description, the following assumes that the packet is a packet on which ECN marking is performed.

503: The receive end device sends a response packet to the transmit end device.

Correspondingly, the transmit end device receives the response packet from the receive end device.

The response packet may be forwarded by the switch. In other words, the receive end device sends the response packet to the switch, and the switch directly forwards the response packet to the transmit end device.

For example, the response packet may be a congestion notification packet (CNP), and a value of an ECN indication field in an IP header of the CNP may be 01.

After receiving the response packet, the transmit end device may reduce a rate of sending a packet to the switch.

For example, after receiving the response packet, the transmit end device may determine a new packet sending rate according to a formula 1.1:

$$CR = TR \times (1 - a/2), \qquad \text{(formula 1.1)}$$

where TR indicates the packet sending rate before the response packet is received, CR indicates the adjusted sending rate, a is a preset parameter, and a value of a may be greater than or equal to 1.

After the packet sending rate is reduced, if the transmit end device continues to receive a response packet from the receive end device, the transmit end device may continue to reduce the packet sending rate.

In some embodiments, if the transmit end device does not continue to receive a response packet from the receive end device (for example, does not receive a response packet from the receive end device in a preset time duration), the transmit end device may increase the packet sending rate.

An operating environment of a data center network may change at any time, and ECN configuration information is not applicable to all operating environments. Therefore, if the ECN configuration information is fixed, the data center network may not adapt to all operating environments.

Figure 6:
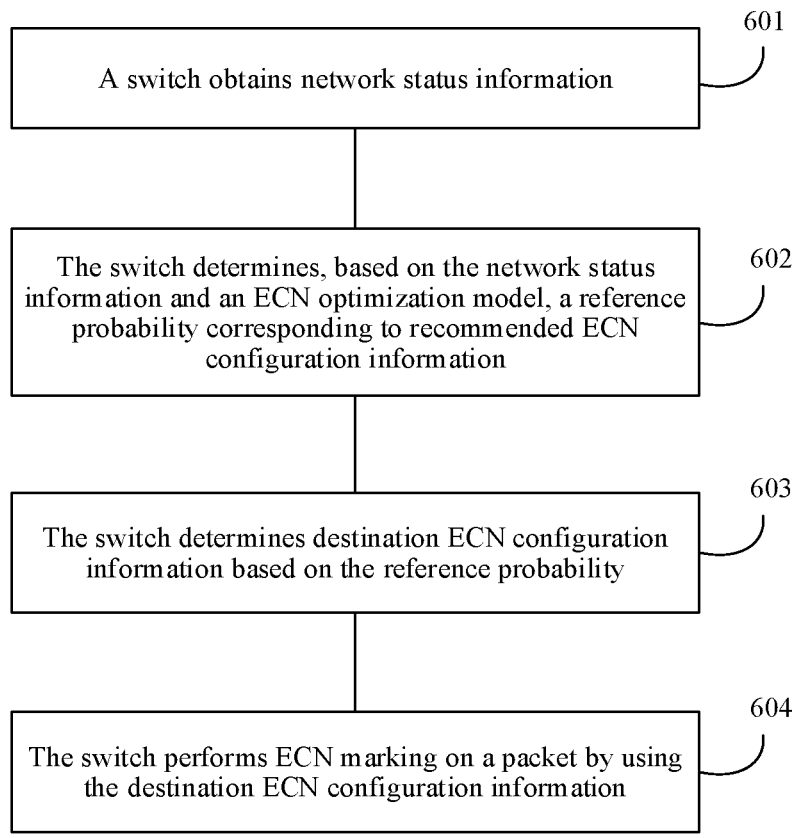
FIG. 6 is a schematic flowchart of a network congestion control method according to an embodiment of this application.

FIG. 6 is a schematic flowchart of a network congestion control method according to an embodiment of this application. The method shown in FIG. 6 may be applied to any data center network in FIG. 2 to FIG. 4. The method shown in FIG. 6 may be performed by a switch, or may be performed by a component (for example, a chip or a circuit) in a switch. For ease of description, the following describes the method shown in FIG. 6 by using a switch as an example. The switch may be a switch connected to a server in the network shown in FIG. 2 to FIG. 4, for example, a switch at the access layer in the data center network shown in FIG. 2, or a switch at the leaf layer in the data center network shown in FIG. 3.

601: The switch obtains network status information.

The network status information is some information used to reflect an operating status of the switch. The network status information may include one or more of network traffic information and network congestion information.

The network traffic information is used to indicate traffic of the switch. The traffic of the switch may be ingress traffic and/or egress traffic of the switch. The network traffic information may include one or more of bandwidth utilization, a quantity of transmitted bytes, a total quantity of transmitted packets, an average quantity of packets, and the like.

The network congestion information is used to indicate a congestion status of the switch. The network congestion information may include one or more of a quantity of ECN marked packets, a quantity of priority-based flow control receive frames, a quantity of priority-based flow control sending frames, an ECN marking rate (namely, a quantity of packets marked in each time unit (for example, per second)), a queue depth (namely, a quantity of to-be-forwarded packets), and the like.

602: The switch determines, based on the network status information and an ECN optimization model, a reference probability corresponding to recommended ECN configuration information.

603: The switch determines destination ECN configuration information based on the reference probability.

604: The switch performs ECN marking on a packet by using the destination ECN configuration information.

Optionally, in some embodiments, that the switch determines destination ECN configuration information based on the reference probability may include that the switch determines whether the recommended ECN configuration information is trustworthy based on the reference probability, and if the recommended ECN configuration information is trustworthy, the switch may determine that the destination ECN configuration information is the recommended ECN configuration information, or if the recommended ECN configuration information is not trustworthy, the switch may determine that reference ECN configuration information is the destination ECN configuration information.

The ECN optimization model is pre-trained and configured in the switch. The switch may input the network status information to the ECN optimization model as input information, and the ECN optimization model may output the recommended ECN configuration information and the reference probability corresponding to the recommended ECN configuration information.

Optionally, in some embodiments, the ECN optimization model may output the recommended ECN configuration information and the reference probability at the same time.

Optionally, in some other embodiments, the ECN optimization model may first output the reference probability, and then output the recommended ECN configuration information after determining, based on the reference probability, that the recommended ECN configuration information is the destination ECN configuration information.

The reference probability may include M probability values, and M is a positive integer greater than or equal to 2. The M probability values are in a one-to-one correspondence with M scenarios. An $m^{th}$ probability value in the M probability values is used to indicate a probability that the recommended ECN configuration information is applicable to an $m^{th}$ scenario (namely, a scenario corresponding to the $m^{th}$ probability value), where m=1, . . . , or M.

Optionally, in some embodiments, that the switch determines whether the recommended ECN configuration information is trustworthy based on the reference probability may include that the switch determines whether a maximum probability value (which may be referred to as a target probability value) in the M probability values is greater than a first preset threshold, and if the target probability value is greater than or equal to the first preset threshold, determines that the recommended ECN configuration information is trustworthy, or if the target probability value is less than the first preset threshold, determines that the recommended ECN configuration information is not trustworthy.

Optionally, in some embodiments, the first preset threshold may be a number greater than or equal to 0.4 and less than or equal to 0.6, for example, 0.4≤the first preset threshold≤0.6.

Optionally, in some other embodiments, that the switch determines whether the recommended ECN configuration information is trustworthy based on the reference probability may include that the switch determines whether a fluctuation coefficient of maximum N probability values in the M probability values is greater than a second preset threshold, where N is a positive integer greater than or equal to 2 and less than M, and if the fluctuation coefficient of the N probability values is greater than or equal to the second preset threshold, determines that the recommended ECN configuration information is trustworthy, or if the fluctuation coefficient of the N probability values is less than the second preset threshold, determines that the recommended ECN configuration information is not trustworthy.

The fluctuation coefficient of the N probability values may be determined according to the following formula 1.2:

$$P_N = \frac{std(P_{topN})}{mean(P_{topN})}, \qquad \text{(formula 1.2)}$$

where $P_N$ indicates the fluctuation coefficient of the N probability values, $P_{topN}$ indicates the N probability values, mean indicates a mean function, and std indicates a standard deviation function.

As described above, when the recommended ECN configuration information is not trustworthy, the switch may determine that reference ECN configuration information is the destination ECN configuration information.

Optionally, in some embodiments, the reference ECN configuration information may be preset ECN configuration information.

For example, in some embodiments, the preset ECN configuration information may be one piece of ECN configuration information obtained through summarizing a plurality of pieces of ECN configuration information, and the preset ECN configuration information may meet requirements of most scenarios.

Optionally, in some other embodiments, the reference ECN configuration information may be determined based on the network status information. In other words, before the switch determines the destination ECN configuration information based on the reference probability, the method further includes that the switch determines the reference ECN configuration information based on the network status information. A process in which the switch determines the reference ECN configuration information based on the network status information may be referred to as a heuristic learning procedure. The following briefly describes a process of determining the reference ECN configuration information by using the heuristic learning procedure with reference to FIG. 7A, FIG. 7B, and FIG. 7C.

Optionally, in some embodiments, the switch may further receive model update information, and update the ECN optimization model based on the model update information.

For example, when the reference ECN configuration information is determined based on the network status information, the switch may further send the network status information and the reference ECN configuration information to a network analysis device. The switch may receive the model update information sent by the network analysis device, and update the ECN optimization model based on the model update information. The network status information and the reference ECN configuration information are parameters used to determine the model update information. In other words, when the ECN configuration information recommended by the ECN optimization model is not trustworthy, the switch may send, to the network analysis device, the ECN configuration information obtained by using the heuristic learning procedure and the corresponding network status information. In this way, the network analysis device may update the ECN optimization model based on the ECN configuration information and the network status information, and send the update information to the switch.

For another example, an administrator of a data center network or a manufacturer of the switch may collect the network status information and the corresponding ECN configuration information, retrain the ECN optimization model by using the collected network status information and ECN configuration information, determine the model update information, and send the model update information to the switch. The switch may update the ECN optimization model based on the model update information.

Optionally, in some other embodiments, the ECN optimization model may not be updated.

If the method shown in FIG. 6 is performed for the first time, the network status information is obtained in a case in which the switch performs ECN marking on the packet by using initial ECN configuration information. For ease of description, the ECN configuration information used to perform ECN marking on the packet when the network status information is obtain is referred to as ECN configuration information corresponding to the network status information.

Optionally, in some embodiments, the initial ECN configuration information may be one piece of ECN configuration information obtained through summarizing a plurality of pieces of ECN configuration information, and the initial ECN configuration information may meet requirements of most scenarios.

Optionally, in some other embodiments, the initial ECN configuration information may be one of two pieces of ECN configuration information obtained through summarizing a plurality of pieces of ECN configuration information. The preset ECN configuration information is the other of the two pieces of ECN configuration information. An operating scenario of the switch may be classified into two types. The initial ECN configuration information may meet a requirement of one of the two types of operating scenarios. The preset ECN configuration information may meet a requirement of the other of the two types of operating scenarios.

If the method shown in FIG. 6 is not performed for the first time, the network status information is obtained in a case in which the switch performs ECN marking on the packet by using destination ECN configuration information determined in a previous round of adjustment.

Figure 7A:
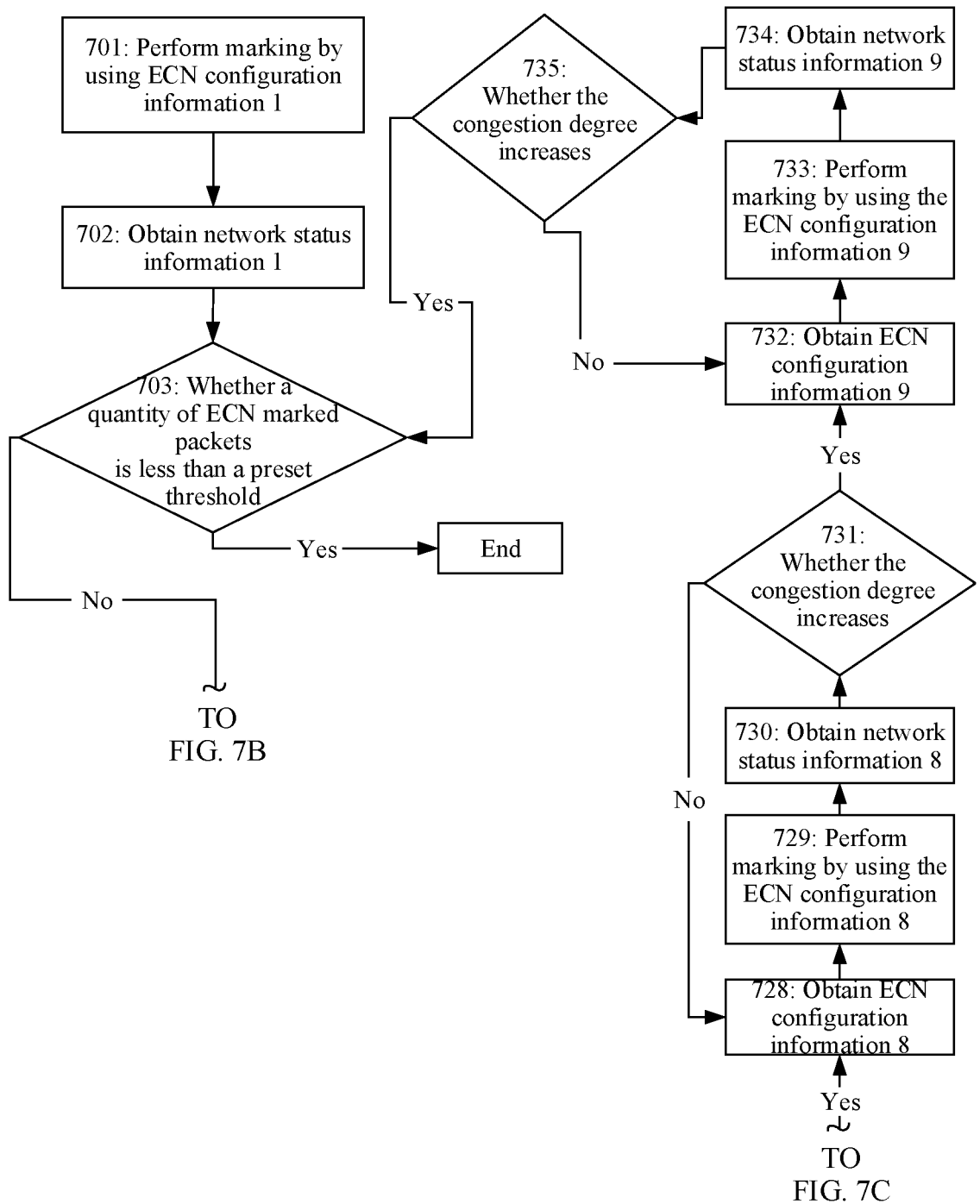
FIG. 7A, FIG. 7B, and FIG. 7C show a network congestion handling method according to an embodiment of this application.
Figure 7B:
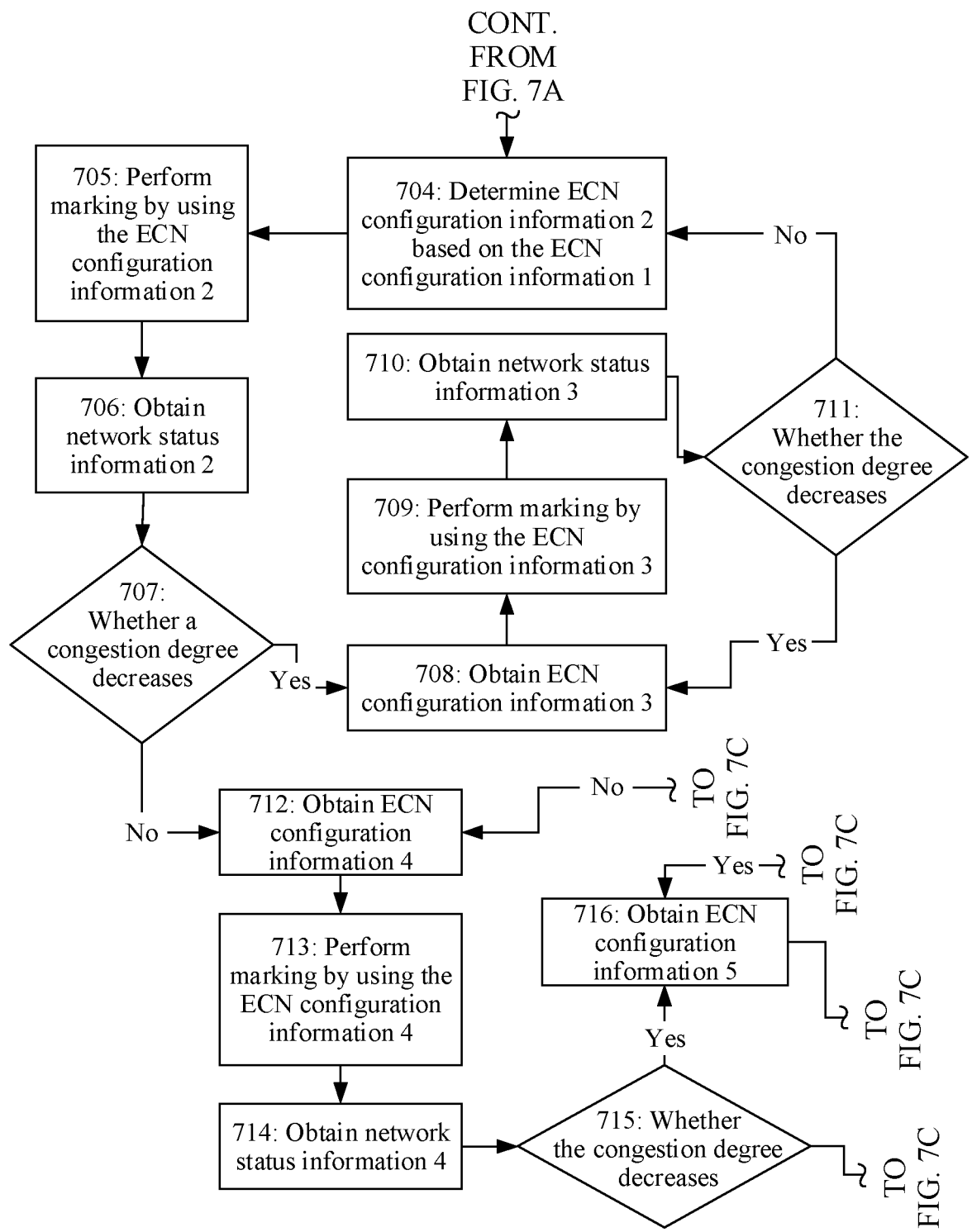
Figure 7C:
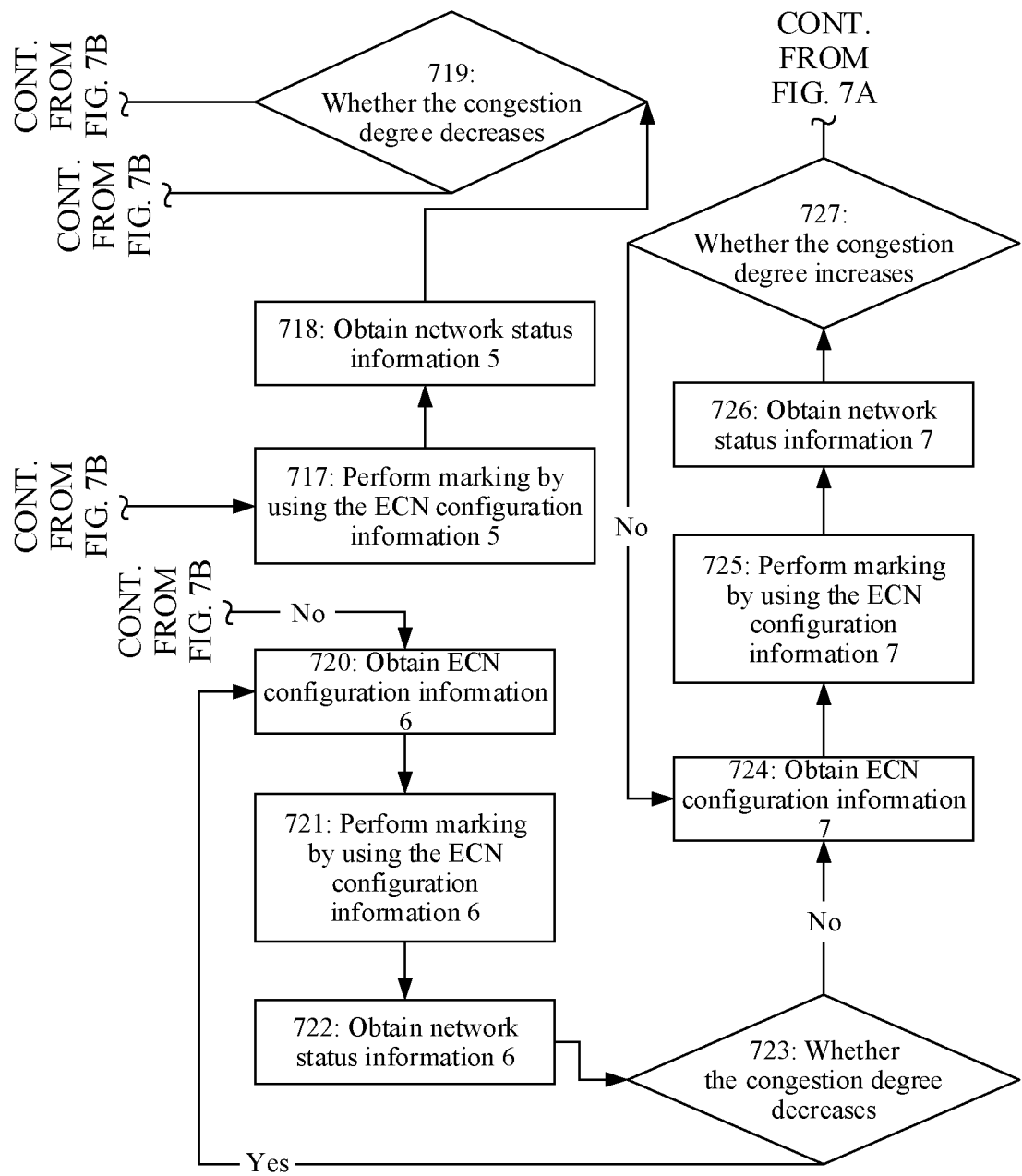

FIG. 7A, FIG. 7B, and FIG. 7C show a network congestion handling method according to an embodiment of this application. The method shown in FIG. 7A, FIG. 7B, and FIG. 7C may be applied to any data center network in FIG. 2 to FIG. 4. The method shown in FIG. 7A, FIG. 7B, and FIG. 7C may be performed by a switch, or may be performed by a component (for example, a chip or a circuit) in a switch. For ease of description, the following describes the method shown in FIG. 7A, FIG. 7B, and FIG. 7C by using a switch as an example. The switch may be a switch connected to a server in the network shown in FIG. 2 to FIG. 4, for example, a switch at the access layer in the data center network shown in FIG. 2, or a switch at the leaf layer in the data center network shown in FIG. 3.

701: A switch performs ECN marking on a packet by using ECN configuration information 1.

For ease of description, in the ECN configuration information 1, an upper ECN threshold may be denoted as $Kmax\_1$, a lower ECN threshold may be denoted as $Kmin\_1$, and a maximum ECN marking probability may be denoted as $Pmax\_1$.

702: The switch obtains network status information 1.

The switch performs ECN marking on the packet based on the ECN configuration information 1. Therefore, the network status information 1 is collected in a case in which the switch performs ECN marking on the packet by using the ECN configuration information 1.

The ECN configuration information may include information used to indicate network traffic (or network traffic information) and information used to indicate congestion (or network congestion information). The network traffic information is used to indicate traffic of the switch. The traffic of the switch may be ingress traffic and/or an egress traffic of the switch. For example, the network traffic information may include one or more of bandwidth utilization, a quantity of transmitted bytes, a total quantity of transmitted packets, an average quantity of packets, and the like. The network congestion information may include one or more of a quantity of ECN marked packets, a quantity of priority-based flow control receive frames, a quantity of priority-based flow control sending frames, an ECN marking rate (namely, a quantity of packets marked in each time unit (for example, per second)), a queue depth (namely, a quantity of to-be-forwarded packets), and the like.

Optionally, in some embodiments, the bandwidth utilization, the quantity of transmitted bytes, the total quantity of transmitted packets, and/or the like in the network traffic information may be total quantity collected by the switch in a time period. In other words, the bandwidth utilization may be total bandwidth utilization in the time period, the quantity of transmitted bytes may be a total quantity of transmitted bytes in the time period, and the total quantity of transmitted packets may be a total quantity of transmitted packets in the time period. Similarly, the quantity of ECN marked packets, the quantity of priority-based flow control receive frames, the quantity of priority-based flow control sending frames, and/or the queue depth that are/is included in the network congestion information may be total quantity collected by the switch in a time period. In other words, the quantity of ECN marked packets may be a total quantity of ECN marked packets in the time period, the quantity of priority-based flow control receive frames may be a total quantity of priority-based flow control receive frames in the time period, the quantity of priority-based flow control sending frames may be a total quantity of priority-based flow control sending frames in the time period, and the queue depth may be a total queue depth in the time period.

Optionally, in some other embodiments, the bandwidth utilization, the quantity of transmitted bytes, the total quantity of transmitted packets, and/or the like in the network traffic information may be quantity per unit of time determined by the switch based on collection time and a collected total quantity. In other words, the bandwidth utilization may be bandwidth utilization per unit of time, the quantity of transmitted bytes may be a quantity of transmitted bytes per unit of time, and the total quantity of transmitted packets may be a total quantity of transmitted packets per unit of time. Similarly, the quantity of ECN marked packets, the quantity of priority-based flow control receive frames, the quantity of priority-based flow control sending frames, and/or the queue depth that are/is included in the network congestion information may be quantity per unit of time determined by the switch based on notification time and a collected total quantity. In other words, the quantity of ECN marked packets may be a quantity of ECN marked packets per unit of time, the quantity of priority-based flow control receive frames may be a quantity of priority-based flow control receive frames per unit of time, the quantity of priority-based flow control sending frames may be a quantity of priority-based flow control sending frames per unit of time, and the queue depth may be a queue depth per unit of time.

The network status information 1 may be collected after a specific time period after the switch starts to perform ECN marking on packets by using the ECN configuration information 1. For example, it is assumed that the switch starts to perform ECN marking on packets by using the ECN configuration information 1 at a moment t1, and the switch may collect network status information (namely, the network status information 1) at a moment t1+T1. From the moment t1 to the moment t1+T1, the switch performs ECN marking on packets by using the ECN configuration information 1. $T_1$ may be a preset value.

In step 702, the network status information 1 obtained by the switch is the network status information obtained by the switch in step 601 in the method shown in FIG. 6. The ECN configuration information 1 is the ECN configuration information corresponding to the network status information in step 601 in the method shown in FIG. 6.

703: The switch may determine whether the quantity of ECN marked packets in the network status information 1 is less than a preset threshold.

If the quantity of ECN marked packets is less than the preset threshold, the switch may continue to perform ECN marking on packets by using the ECN configuration information 1, and an ECN configuration information adjustment procedure ends.

If the quantity of ECN marked packets is greater than or equal to the preset threshold, step 704 may be performed.

704: The switch determines ECN configuration information 2 based on the ECN configuration information 1.

For ease of description, in the ECN configuration information 2, an upper ECN threshold may be denoted as Kmax_2, a lower ECN threshold may be denoted as Kmin_2, and a maximum ECN marking probability may be denoted as Pmax_2.

The ECN configuration information 1 has the following relationship with the ECN configuration information 2: Kmax_1<Kmax_2, Kmin_1=Kmin_2, and Pmax_1=Pmax_2.

In other words, the switch may increase the upper ECN threshold in the ECN configuration information 1, and remain the lower ECN threshold and the maximum ECN marking probability unchanged.

705: The switch performs ECN marking on packets by using the ECN configuration information 2.

706: The switch obtains network status information 2.

The switch performs ECN marking on packets based on the ECN configuration information 2. Therefore, the network status information 2 is collected in a case in which the switch performs ECN marking on packets by using the ECN configuration information 2.

Similar to the network status information 1, the network status information 2 may be collected after a specific time period after the switch starts to perform ECN marking on packets by using the ECN configuration information 2. For example, it is assumed that the switch starts to perform ECN marking on packets by using the ECN configuration information 2 at a moment t2, and the switch may collect network status information (namely, the network status information 2) at a moment t2+T2. From the moment t2 to the moment t2+T2, the switch performs ECN marking on packets by using the ECN configuration information 2. T2 may be a preset value. In some embodiments, a value of T1 may be equal to a value of T2. In some other embodiments, a value of T1 may not be equal to a value of T2.

707: The switch determines whether a congestion degree of the switch decreases.

The switch may determine, based on the network status information 2 and the network status information 1, whether the congestion degree of the switch decreases.

In some embodiments, the switch determines, based on a change of the queue depth, whether the congestion degree of the switch decreases.

For example, if T1 is equal to T2, the switch may determine, based on the queue depth in the network status information 1 and a queue depth in the network status information 2, whether the congestion degree of the switch decreases. If the queue depth decreases (that is, the queue depth in the network status information 2 is less than the queue depth in the network status information 1), it indicates that the quantity of to-be-forwarded packets decreases. In this case, the switch may determine that the congestion degree of the switch decreases. If the queue depth remains unchanged or increases (the queue depth in the network status information 2 is greater than or equal to the queue depth in the network status information 1), the switch may determine that the congestion degree of the switch does not decrease.

For another example, if T1 is not equal to T2, the switch may determine, based on the value of T2, the value of T1, the queue depth in the network status information 1, and the queue depth in the network status information 2, whether the congestion degree of the switch decreases. It is assumed that the queue depth in the network status information 1 is L1, the queue depth in the network status information 2 is L2, and the switch may determine whether L1/T1 is greater than L2/T2. If L1/T1 is less than or equal to L2/T2, it indicates that the congestion degree of the switch does not decrease. If L1/T1 is greater than L2/T2, it indicates that the congestion degree of the switch decreases.

In some other embodiments, the switch may determine, based on the quantity of ECN marked packets, whether the congestion degree of the switch decreases.

For example, if T1 is equal to T2, the switch may determine, based on the quantity of ECN marked packets in the network status information 1 and a quantity of ECN marked packets in the network status information 2, whether the congestion degree of the switch decreases. An ECN marking probability may be positively correlated to the queue depth. In other words, if the queue depth increases, the ECN marking probability increases, and correspondingly, the quantity of ECN marked packets increases in a same time period. If the queue depth decreases, the ECN marking probability decreases, and correspondingly, the quantity of ECN marked packets decreases in a same time period. Therefore, if the quantity of ECN marked packets decreases (that is, the quantity of ECN marked packets in the network status information 2 is less than the quantity of ECN marked packets in the network status information 1), it indicates that the ECN marking probability decreases, and correspondingly, the quantity of to-be-forwarded packets decreases. In this case, the switch may determine that the congestion degree of the switch decreases. If the quantity of ECN marked packets remains unchanged or increases (the quantity of ECN marked packets in the network status information 2 is greater than or equal to the quantity of ECN marked packets in the network status information 1), the switch may determine that the congestion degree of the switch does not decrease.

For another example, if T1 is not equal to T2, the switch may determine a quantity of ECN marked packets per unit of time (which may be referred to as an ECN marking rate 1) based on T1 and the quantity of ECN marked packets in the network status information 1, and determine a quantity of ECN marked packets per a unit of time (which may be referred to as an ECN marking rate 2) based on T2 and the quantity of ECN marked packets in the network status information 2. If the ECN marking rate 1 is greater than the ECN marking rate 2, it indicates that the congestion degree of the switch decreases. If the ECN marking rate 1 is less than or equal to the ECN marking rate 2, it indicates that the congestion degree of the switch does not decrease.

In some other embodiments, the switch may alternatively determine, based on the quantity of transmitted bytes, whether the congestion degree of the switch decreases.

For example, if T1 is equal to T2, the switch may determine, based on the quantity of transmitted bytes in the network status information 1 and a quantity of transmitted bytes in the network status information 2, whether the congestion degree of the switch decreases. If the network congestion degree decreases, the quantity of transmitted bytes in a same time period increases. Therefore, if the quantity of transmitted bytes increase (that is, the quantity of transmitted bytes in the network status information 2 is greater than the quantity of transmitted bytes in the network status information 1), the switch may determine that the congestion degree of the switch decreases. If the quantity of transmitted bytes remains unchanged or decreases (the quantity of transmitted bytes in the network status information 2 is less than or equal to the quantity of transmitted bytes in the network status information 1), the switch may determine that the congestion degree of the switch does not decrease.

For another example, if T1 is not equal to T2, the switch may determine a quantity of transmitted bytes per unit of time (which may be referred to as a transmission rate 1) based on T1 and the quantity of transmitted bytes in the network status information 1, and determine a quantity of transmitted bytes per unit of time (which may be referred to as a transmission rate 2) based on T2 and the quantity of transmitted bytes in the network status information 2. If the transmission rate 1 is less than the transmission rate 2, it indicates that the congestion degree of the switch decreases. If the transmission rate 1 is greater than or equal to the transmission rate 2, it indicates that the congestion degree of the switch does not decrease.

The switch may alternatively determine, based on information in one or more of other information in the network status information 1 and the network status information 2, whether the congestion degree of the switch decreases. Other examples are not listed one by one herein.

If a determining result of step 707 is yes (that is, the congestion degree of the switch decreases), step 708 is performed.

If a determining result of step 707 is no (that is, the congestion degree of the switch does not decrease), step 712 is performed.

That the congestion degree of the switch decreases may be referred to as positive feedback of the network status information. That the congestion degree of the switch increases may be referred to as negative feedback of the network status information.

708: The switch determines ECN configuration information 3 based on the ECN configuration information 2.

For ease of description, in the ECN configuration information 3, an upper ECN threshold may be denoted as Kmax_3, a lower ECN threshold may be denoted as Kmin_3, and a maximum ECN marking probability may be denoted as Pmax_3.

The ECN configuration information 2 has the following relationship with the ECN configuration information 3: Kmax_2<Kmax_3, Kmin_2<Kmin_3, and Pmax_2=Pmax_3.

In other words, the switch may increase the upper ECN threshold and the lower ECN threshold in the ECN configuration information 2, and remain the maximum ECN marking probability unchanged.

709: The switch performs ECN marking on packets by using the ECN configuration information 3.

710: The switch obtains network status information 3.

The switch performs ECN marking on packets based on the ECN configuration information 3. Therefore, the network status information 3 is collected in a case in which the switch performs ECN marking on packets by using the ECN configuration information 3.

Similar to the network status information 1, the network status information 3 may be collected after a specific time period after the switch starts to perform ECN marking on packets by using the ECN configuration information 3. For example, it is assumed that the switch starts to perform ECN marking on packets by using the ECN configuration information 3 at a moment t3, and the switch may collect network status information (namely, the network status information 3) at a moment t3+T3. From the moment t3 to the moment t3+T3, the switch performs ECN marking on packets by using the ECN configuration information 3. T3 may be a preset value. In some embodiments, a value of T3 may be equal to the value of T2. In some other embodiments, a value of T3 may not be equal to the value of T2.

711: The switch determines whether the congestion degree of the switch decreases.

The switch may determine, based on the network status information 2 and the network status information 3, whether the congestion degree of the switch decreases.

A specific implementation in which the switch may determine, based on the network status information 2 and the network status information 3, whether the congestion degree of the switch decreases is similar to a specific implementation in which the switch determines, based on the network status information 1 and the network status information 2, whether the congestion degree of the switch decreases. For brevity, details are not described herein again.

If a determining result of step 711 is yes (that is, the congestion degree of the switch decreases), the switch may increase the upper ECN threshold and the lower ECN threshold in the ECN configuration information 3, and remain the maximum ECN marking probability unchanged. Then, the switch may perform ECN marking on packets by using adjusted ECN configuration information, continue to obtain corresponding network status information, and determine, based on the network status information and the network status information 3, whether the congestion degree of the switch decreases. In other words, if the determining result of step 711 is yes, the switch performs steps similar to step 708 to step 711. To be specific, the switch determines ECN configuration information 3-1 based on the ECN configuration information 3, marks packets by using the ECN configuration information 3-1, obtains network status information 3-1, and determines whether the congestion degree of the switch decreases. A determining manner in which the switch determines the ECN configuration information 3-1 based on the ECN configuration information 3 is the same as a determining manner in which the switch determines the ECN configuration information 3 based on the ECN configuration information 2. A specific determining manner in which the switch determines, based on the network status information 3 and the network status information 3-1, whether the congestion degree of the switch decreases is the same as a specific determining manner in which the switch determines, based on the network status information 2 and the network status information 3, whether the congestion degree of the switch decreases.

If a determining result of step 711 is no (that is, the congestion degree of the switch does not decrease), the switch may increase the upper ECN threshold in the ECN configuration information 3, and remain the lower ECN threshold and the maximum ECN marking probability unchanged. Then, the switch may perform ECN marking on packets by using adjusted ECN configuration information, continue to obtain corresponding network status information, and determine, based on the network status information and the network status information 3, whether the congestion degree of the switch decreases. In other words, if the determining result of step 711 is no, the switch performs steps similar to step 704 to step 707. To be specific, the switch determines ECN configuration information 3-2 based on the ECN configuration information 3, marks packets by using the ECN configuration information 3-2, obtains network status information 3-2, and determines whether the congestion degree of the switch decreases. A determining manner in which the switch determines the ECN configuration information 3-2 based on the ECN configuration information 3 is the same as a determining manner in which the switch determines the ECN configuration information 2 based on the ECN configuration information 1. A specific determining manner in which the switch determines, based on the network status information 3 and the network status information 3-2, whether the congestion degree of the switch decreases is the same as a specific determining manner in which the switch determines, based on the network status information 1 and the network status information 2, whether the congestion degree of the switch decreases.

712: The switch determines ECN configuration information 4 based on the ECN configuration information 2.

For ease of description, in the ECN configuration information 4, an upper ECN threshold may be denoted as $Kmax\_4$, a lower ECN threshold may be denoted as $Kmin\_4$, and a maximum ECN marking probability may be denoted as $Pmax\_4$.

The ECN configuration information 4 has the following relationship with the ECN configuration information 2: $Kmax\_2=Kmax\_4$, $Kmin\_2<Kmin\_4$, and $Pmax\_2=Pmax\_4$.

In other words, the switch may increase the lower ECN threshold in the ECN configuration information 2, and remain the upper ECN threshold and the maximum ECN marking probability unchanged.

713: The switch performs ECN marking on packets by using the ECN configuration information 4.

714: The switch obtains network status information 4.

The switch performs ECN marking on packets based on the ECN configuration information 4. Therefore, the network status information 4 is collected in a case in which the switch performs ECN marking on packets by using the ECN configuration information 4.

Similar to the network status information 1, the network status information 4 may be collected after a specific time period after the switch starts to perform ECN marking on packets by using the ECN configuration information 4. For example, it is assumed that the switch starts to perform ECN marking on packets by using the ECN configuration information 4 at a moment t4, and the switch may collect network status information (namely, the network status information 4) at a moment t4+T4. From the moment t4 to the moment t4+T4, the switch performs ECN marking on packets by using the ECN configuration information 4. T4 may be a preset value. In some embodiments, a value of T4 may be equal to the value of T2. In some other embodiments, a value of T4 may not be equal to the value of T2.

715: The switch determines whether the congestion degree of the switch decreases.

The switch may determine, based on the network status information 2 and the network status information 4, whether the congestion degree of the switch decreases.

A specific implementation in which the switch may determine, based on the network status information 2 and the network status information 4, whether the congestion degree of the switch decreases is similar to a specific implementation in which the switch determines, based on the network status information 1 and the network status information 2, whether the congestion degree of the switch decreases. For brevity, details are not described herein again.

If a determining result of step 715 is yes (that is, the congestion degree of the switch decreases), step 716 is performed.

If a determining result of step 715 is no (that is, the congestion degree of the switch does not decrease), step 720 is performed.

716: The switch determines ECN configuration information 5 based on the ECN configuration information 4.

For ease of description, in the ECN configuration information 5, an upper ECN threshold may be denoted as $Kmax\_5$, a lower ECN threshold may be denoted as $Kmin\_5$, and a maximum ECN marking probability may be denoted as $Pmax\_5$.

The ECN configuration information 4 has the following relationship with the ECN configuration information 5: $Kmax\_4=Kmax\_5$, $Kmin\_4<Kmin\_5$, and $Pmax\_4>Pmax\_5$.

In other words, the switch may increase the lower ECN threshold in the ECN configuration information 4, reduce the maximum ECN marking probability, and remain the upper ECN threshold unchanged.

717: The switch performs ECN marking on packets by using the ECN configuration information 5.

718: The switch obtains network status information 5.

The switch performs ECN marking on packets based on the ECN configuration information 5. Therefore, the network status information 5 is collected in a case in which the switch performs ECN marking on packets by using the ECN configuration information 5.

Similar to the network status information 1, the network status information 5 may be collected after a specific time period after the switch starts to perform ECN marking on packets by using the ECN configuration information 5. For example, it is assumed that the switch starts to perform ECN marking on packets by using the ECN configuration information 5 at a moment t5, and the switch may collect network status information (namely, the network status information 5) at a moment t5+T5. From the moment t5 to the moment t5+T5, the switch performs ECN marking on packets by using the ECN configuration information 5. T5 may be a preset value. In some embodiments, a value of T5 may be equal to the value of T4. In some other embodiments, a value of T5 may not be equal to the value of T4.

719: The switch determines whether the congestion degree of the switch decreases.

The switch may determine, based on the network status information 4 and the network status information 5, whether the congestion degree of the switch decreases.

A specific implementation in which the switch may determine, based on the network status information 4 and the network status information 5, whether the congestion degree of the switch decreases is similar to a specific implementation in which the switch determines, based on the network status information 1 and the network status information 2, whether the congestion degree of the switch decreases. For brevity, details are not described herein again.

If a determining result of step 719 is yes (that is, the congestion degree of the switch decreases), the switch may increase the lower ECN threshold in the ECN configuration information 5, reduce the maximum ECN marking probability, and remain the upper ECN threshold unchanged. Then, the switch may perform ECN marking on packets by using adjusted ECN configuration information, continue to obtain corresponding network status information, and determine, based on the network status information and the network status information 5, whether the congestion degree of the switch decreases. In other words, if the determining result of step 719 is yes, the switch performs steps similar to step 716 to step 719. To be specific, the switch determines ECN configuration information 5-1 based on the ECN configuration information 5, marks packets by using the ECN configuration information 5-1, obtains network status information 5-1, and determines whether the congestion degree of the switch decreases. A determining manner in which the switch determines the ECN configuration information 5-1 based on the ECN configuration information 5 is the same as a determining manner in which the switch determines the ECN configuration information 5 based on the ECN configuration information 4. A specific determining manner in which the switch determines, based on the network status information 5 and the network status information 5-1, whether the congestion degree of the switch decreases is the same as a specific determining manner in which the switch determines, based on the network status information 4 and the network status information 5, whether the congestion degree of the switch decreases.

If a determining result of step 719 is no (that is, the congestion degree of the switch does not decrease), the switch may increase the lower ECN threshold in the ECN configuration information 5, and remain the upper ECN threshold and the maximum ECN marking probability unchanged. Then, the switch may perform ECN marking on packets by using adjusted ECN configuration information, continue to obtain corresponding network status information, and determine, based on the network status information and the network status information 5, whether the congestion degree of the switch decreases. In other words, if the determining result of step 719 is no, the switch performs steps similar to step 712 to step 715. To be specific, the switch determines ECN configuration information 5-2 based on the ECN configuration information 5, marks packets by using the ECN configuration information 5-2, obtains network status information 5-2, and determines whether the congestion degree of the switch decreases. A determining manner in which the switch determines the ECN configuration information 5-2 based on the ECN configuration information 5 is the same as a determining manner in which the switch determines the ECN configuration information 4 based on the ECN configuration information 2. A specific determining manner in which the switch determines, based on the network status information 5 and the network status information 5-2, whether the congestion degree of the switch decreases is the same as a specific determining manner in which the switch determines, based on the network status information 2 and the network status information 4, whether the congestion degree of the switch decreases.

720: The switch determines ECN configuration information 6 based on the ECN configuration information 4.

For ease of description, in the ECN configuration information 6, an upper ECN threshold may be denoted as $Kmax\_6$, a lower ECN threshold may be denoted as $Kmin\_6$, and a maximum ECN marking probability may be denoted as $Pmax\_6$.

The ECN configuration information 4 has the following relationship with the ECN configuration information 6: $Kmax\_4=Kmax\_6$, $Kmin\_4=Kmin\_6$, and $Pmax\_4>Pmax\_6$.

In other words, the switch may reduce the maximum ECN marking probability in the ECN configuration information 4, and remain the lower ECN threshold and the upper ECN threshold unchanged.

721: The switch performs ECN marking on packets by using the ECN configuration information 6.

722: The switch obtains network status information 6.

The switch performs ECN marking on packets based on the ECN configuration information 6. Therefore, the network status information 6 is collected in a case in which the switch performs ECN marking on packets by using the ECN configuration information 6.

Similar to the network status information 1, the network status information 6 may be collected after a specific time period after the switch starts to perform ECN marking on packets by using the ECN configuration information 6. For example, it is assumed that the switch starts to perform ECN marking on packets by using the ECN configuration information 6 at a moment t6, and the switch may collect network status information (namely, the network status information 6) at a moment t6+T6. From the moment t6 to the moment t6+T6, the switch performs ECN marking on packets by using the ECN configuration information 6. T6 may be a preset value. In some embodiments, a value of T6 may be equal to the value of T4. In some other embodiments, a value of T6 may not be equal to the value of T4.

723: The switch determines whether the congestion degree of the switch decreases.

The switch may determine, based on the network status information 4 and the network status information 6, whether the congestion degree of the switch decreases.

A specific implementation in which the switch may determine, based on the network status information 4 and the network status information 6, whether the congestion degree of the switch decreases is similar to a specific implementation in which the switch determines, based on the network status information 1 and the network status information 2, whether the congestion degree of the switch decreases. For brevity, details are not described herein again.

If a determining result of step 723 is yes (that is, the congestion degree of the switch decreases), the switch may reduce the maximum ECN marking probability in the ECN configuration information 6, and remain the lower ECN threshold and the upper ECN threshold unchanged. Then, the switch may perform ECN marking on packets by using adjusted ECN configuration information, continue to obtain corresponding network status information, and determine, based on the network status information and the network status information 6, whether the congestion degree of the switch decreases. In other words, if the determining result of step 723 is yes, the switch performs steps similar to step 720 to step 723. To be specific, the switch determines ECN configuration information 6-1 based on the ECN configuration information 6, marks packets by using the ECN configuration information 6-1, obtains network status information 6-1, and determines whether the congestion degree of the switch decreases. A determining manner in which the switch determines the ECN configuration information 6-1 based on the ECN configuration information 6 is the same as a determining manner in which the switch determines the ECN configuration information 6 based on the ECN configuration information 4. A specific determining manner in which the switch determines, based on the network status information 6 and the network status information 6-1, whether the congestion degree of the switch decreases is the same as a specific determining manner in which the switch determines, based on the network status information 4 and the network status information 6, whether the congestion degree of the switch decreases.

If a determining result of step 723 is no (that is, the congestion degree of the switch does not decrease), step 724 is performed.

724: The switch determines ECN configuration information 7 based on the ECN configuration information 6.

For ease of description, in the ECN configuration information 7, an upper ECN threshold may be denoted as Kmax_7, a lower ECN threshold may be denoted as Kmin_7, and a maximum ECN marking probability may be denoted as Pmax_7.

The ECN configuration information 6 has the following relationship with the ECN configuration information 7: Kmax_6≥Kmax_7, Kmin_6=Kmin_7, and Pmax_6=Pmax_7.

In other words, the switch may reduce the upper ECN threshold in the ECN configuration information 6, and remain the lower ECN threshold and the maximum ECN marking probability unchanged.

725: The switch performs ECN marking on packets by using the ECN configuration information 7.

726: The switch obtains network status information 7.

The switch performs ECN marking on packets based on the ECN configuration information 7. Therefore, the network status information 7 is collected in a case in which the switch performs ECN marking on packets by using the ECN configuration information 7.

Similar to the network status information 1, the network status information 7 may be collected after a specific time period after the switch starts to perform ECN marking on packets by using the ECN configuration information 7. For example, it is assumed that the switch starts to perform ECN marking on packets by using the ECN configuration information 7 at a moment t7, and the switch may collect network status information (namely, the network status information 7) at a moment t7+T7. From the moment t7 to the moment t7+T7, the switch performs ECN marking on packets by using the ECN configuration information 7. T7 may be a preset value. In some embodiments, a value of T7 may be equal to the value of T6. In some other embodiments, a value of T7 may not be equal to the value of T6.

727: The switch determines whether the congestion degree of the switch increases.

The switch may determine, based on the network status information 6 and the network status information 7, whether the congestion degree of the switch increases.

A specific implementation in which the switch may determine, based on the network status information 6 and the network status information 7, whether the congestion degree of the switch increases is similar to a specific implementation in which the switch determines, based on the network status information 1 and the network status information 2, whether the congestion degree of the switch decreases. For brevity, details are not described herein again.

If a determining result of step 727 is no (that is, the congestion degree of the switch does not increase), the switch may reduce the upper ECN threshold in the ECN configuration information 7, and remain the lower ECN threshold and the maximum ECN marking probability unchanged. Then, the switch may perform ECN marking on packets by using adjusted ECN configuration information, continue to obtain corresponding network status information, and determine, based on the network status information and the network status information 7, whether the congestion degree of the switch decreases. In other words, if the determining result of step 727 is no, the switch performs steps similar to step 724 to step 727. To be specific, the switch determines ECN configuration information 7-1 based on the ECN configuration information 7, marks packets by using the ECN configuration information 7-1, obtains network status information 7-1, and determines whether the congestion degree of the switch decreases. A determining manner in which the switch determines the ECN configuration information 7-1 based on the ECN configuration information 7 is the same as a determining manner in which the switch determines the ECN configuration information 7 based on the ECN configuration information 6. A specific determining manner in which the switch determines, based on the network status information 7 and the network status information 7-1, whether the congestion degree of the switch decreases is the same as a specific determining manner in which the switch determines, based on the network status information 6 and the network status information 7, whether the congestion degree of the switch decreases.

If a determining result of step 727 is yes (that is, the congestion degree of the switch increases), step 728 is performed.

728: The switch determines ECN configuration information 8 based on the ECN configuration information 7.

For ease of description, in the ECN configuration information 8, an upper ECN threshold may be denoted as Kmax_8, a lower ECN threshold may be denoted as Kmin_8, and a maximum ECN marking probability may be denoted as Pmax_8.

The ECN configuration information 7 has the following relationship with the ECN configuration information 8: Kmax_7=Kmax_8, Kmin_7>Kmin_8, and Pmax_7=Pmax_8.

In other words, the switch may reduce the lower ECN threshold in the ECN configuration information 7, and remain the upper ECN threshold and the maximum ECN marking probability unchanged.

729: The switch performs ECN marking on packets by using the ECN configuration information 8.

730: The switch obtains network status information 8.

The switch performs ECN marking on packets based on the ECN configuration information 8. Therefore, the network status information 8 is collected in a case in which the switch performs ECN marking on packets by using the ECN configuration information 8.

Similar to the network status information 1, the network status information 8 may be collected after a specific time period after the switch starts to perform ECN marking on packets by using the ECN configuration information 8. For example, it is assumed that the switch starts to perform ECN marking on packets by using the ECN configuration information 8 at a moment t8, and the switch may collect network status information (namely, the network status information 8) at a moment t8+T8. From the moment t8 to the moment t8+T8, the switch performs ECN marking on the packet by using the ECN configuration information 8. T8 may be a preset value. In some embodiments, a value of T8 may be equal to the value of T7. In some other embodiments, a value of T8 may not be equal to the value of T7.

731: The switch determines whether the congestion degree of the switch increases.

The switch may determine, based on the network status information 7 and the network status information 8, whether the congestion degree of the switch increases.

A specific implementation in which the switch may determine, based on the network status information 7 and the network status information 8, whether the congestion degree of the switch increases is similar to a specific implementation in which the switch determines, based on the network status information 1 and the network status information 2, whether the congestion degree of the switch decreases. For brevity, details are not described herein again.

If a determining result of step 731 is no (that is, the congestion degree of the switch does not increase), the switch may reduce the lower ECN threshold in the ECN configuration information 8, and remain the upper ECN threshold and the maximum ECN marking probability unchanged. Then, the switch may perform ECN marking on packets by using adjusted ECN configuration information, continue to obtain corresponding network status information, and determine, based on the network status information and the network status information 8, whether the congestion degree of the switch decreases. In other words, if the determining result of step 731 is no, the switch performs steps similar to step 728 to step 731. To be specific, the switch determines ECN configuration information 8-1 based on the ECN configuration information 8, marks packets by using the ECN configuration information 8-1, obtains network status information 8-1, and determines whether the congestion degree of the switch decreases. A determining manner in which the switch determines the ECN configuration information 8-1 based on the ECN configuration information 8 is the same as a determining manner in which the switch determines the ECN configuration information 8 based on the ECN configuration information 7. A specific determining manner in which the switch determines, based on the network status information 8 and the network status information 8-1, whether the congestion degree of the switch decreases is the same as a specific determining manner in which the switch determines, based on the network status information 7 and the network status information 8, whether the congestion degree of the switch decreases.

If a determining result of step 731 is yes (that is, the congestion degree of the switch increases), step 732 is performed.

732: The switch determines ECN configuration information 9 based on the ECN configuration information 8.

For ease of description, in the ECN configuration information 9, an upper ECN threshold may be denoted as Kmax_9, a lower ECN threshold may be denoted as Kmin_9, and a maximum ECN marking probability may be denoted as Pmax_9.

The ECN configuration information 8 has the following relationship with the ECN configuration information 9: Kmax_8=Kmax_9, Kmin_8=Kmin_9, and Pmax_8<Pmax_9.

In other words, the switch may increase the maximum ECN marking probability in the ECN configuration information 8, and remain the upper ECN threshold and the lower ECN threshold unchanged.

733: The switch performs ECN marking on packets by using the ECN configuration information 9.

734: The switch obtains network status information 9.

The switch performs ECN marking on packets based on the ECN configuration information 9. Therefore, the network status information 9 is collected in a case in which the switch performs ECN marking on packets by using the ECN configuration information 9.

Similar to the network status information 1, the network status information 9 may be collected after a specific time period after the switch starts to perform ECN marking on packets by using the ECN configuration information 9. For example, it is assumed that the switch starts to perform ECN marking on packets by using the ECN configuration information 9 at a moment t9, and the switch may collect network status information (namely, the network status information 9) at a moment t9+T9. From the moment t9 to the moment t9+T9, the switch performs ECN marking on packets by using the ECN configuration information 9. T9 may be a preset value. In some embodiments, a value of T9 may be equal to the value of T8. In some other embodiments, a value of T9 may not be equal to the value of T8.

735: The switch determines whether the congestion degree of the switch increases.

The switch may determine, based on the network status information 8 and the network status information 9, whether the congestion degree of the switch increases.

A specific implementation in which the switch may determine, based on the network status information 8 and the network status information 9, whether the congestion degree of the switch increases is similar to a specific implementation in which the switch determines, based on the network status information 1 and the network status information 2, whether the congestion degree of the switch decreases. For brevity, details are not described herein again.

If a determining result of step 735 is no (that is, the congestion degree of the switch does not increase), the switch may increase the maximum ECN marking probability in the ECN configuration information 9, and remain the upper ECN threshold and the lower ECN threshold unchanged. Then, the switch may perform ECN marking on packets by using adjusted ECN configuration information, continue to obtain corresponding network status information, and determine, based on the network status information and the network status information 9, whether the congestion degree of the switch decreases. In other words, if the determining result of step 735 is no, the switch performs steps similar to step 732 to step 735. To be specific, the switch determines ECN configuration information 9-1 based on the ECN configuration information 9, marks packets by using the ECN configuration information 9-1, obtains network status information 9-1, and determines whether the congestion degree of the switch decreases. A determining manner in which the switch determines the ECN configuration information 9-1 based on the ECN configuration information 9 is the same as a determining manner in which the switch determines the ECN configuration information 9 based on the ECN configuration information 8. A specific determining manner in which the switch determines, based on the network status information 9 and the network status information 9-1, whether the congestion degree of the switch decreases is the same as a specific determining manner in which the switch determines, based on the network status information 8 and the network status information 9, whether the congestion degree of the switch decreases.

If a determining result of step 735 is yes (that is, the congestion degree of the switch increases), it may be determined that a quantity of ECN marked packets in the network status information 9 is less than the preset threshold. If the quantity of ECN marked packets in the network status information 9 is less than the preset threshold, the switch may continue to perform ECN marking on packets by using the ECN configuration information 9. If the quantity of ECN marked packets in the network status information 9 is greater than or equal to the preset threshold, the switch may increase the upper ECN threshold in the ECN configuration information 9, and remain the lower ECN threshold and the maximum ECN marking probability unchanged. Then, the switch may perform ECN marking on packets by using adjusted ECN configuration information, continue to obtain corresponding network status information, and determine, based on the network status information and the network status information 9, whether the congestion degree of the switch decreases. In other words, if the determining result of step 735 is yes, the switch performs a step similar to step 703. The switch may continue to determine ECN configuration information with reference to step 703.

After the foregoing steps, the ECN configuration information determined by the switch may finally converge at the ECN configuration information 9, and the ECN configuration information adjustment procedure ends. If the ECN configuration information does not converge at the ECN configuration information 9, the switch may repeat the method shown in FIG. 7A, FIG. 7B, and FIG. 7C until the ECN configuration information finally converges, and the ECN configuration information adjustment procedure ends. In other words, in this case, the ECN configuration information in step 701 is ECN configuration information 9 obtained in a previous adjustment procedure.

If step 701 is performed for the first time, that is, the ECN configuration information in step 701 is not ECN configuration information 9 obtained in a previous adjustment procedure, the ECN configuration information 1 may be referred to as initial ECN configuration information. The initial ECN configuration information may be a preset value.

In a procedure shown in FIG. 7A, FIG. 7B, and FIG. 7C, the upper ECN threshold in the ECN configuration information is increased for a plurality of times. For example, in step 704, the switch obtains the ECN configuration information 2 by increasing the upper ECN threshold in the ECN configuration information 1. In step 708, the switch obtains the ECN configuration information 3 by increasing the upper ECN threshold in the ECN configuration information 2. For ease of description, in the following, it is assumed that Kmax_1, Kmax_2, and Kmax_3 have the following relationships:

$$Kmax\_2 = Kmax\_1 + \Delta_{12}, \text{ and}$$

$$Kmax\_3 = Kmax\_2 + \Delta_{23}.$$

In other words, the upper ECN threshold in the ECN configuration information 1 increases by $\Delta_{12}$ to obtain the upper ECN threshold in the ECN configuration information 2, and the upper ECN threshold in the ECN configuration information 2 increases by $\Delta_{23}$ to obtain the upper ECN threshold in the ECN configuration information 3, where $\Delta_{12}$ and $\Delta_{23}$ are numbers greater than 0.

Optionally, in some embodiments, the upper ECN threshold increases by a preset value, and increases by a same level each time. In other words, $\Delta_{12}$ is equal to $\Delta_{23}$.

Optionally, in some other embodiments, the upper ECN threshold increases by a preset value, and increases by different levels each time. In other words, $\Delta_{12}$ is not equal to $\Delta_{23}$.

Optionally, in some other embodiments, the upper ECN threshold increases by a preset proportion, and increases by a same proportion each time. For example, $\Delta_{12}$=Kmax_1×k %, and $\Delta_{23}$=Kmax_2×k %, where k is a number greater than 0.

Optionally, in some other embodiments, the upper ECN threshold increases by a preset proportion, and increases by different proportions each time. For example, $\Delta_{12}$=Kmax_1×$k_1$%, and $\Delta_{23}$=Kmax_2×$k_2$%, where $k_1$ and $k_2$ are numbers greater than 0, and $k_1$ is not equal to $k_2$.

Similarly, in the procedure shown in FIG. 7A, FIG. 7B, and FIG. 7C, the upper ECN threshold in the ECN configuration information also decreases for a plurality of times, and a manner of reducing the upper ECN threshold each time may be similar to a manner of increasing the upper ECN threshold. For example, the upper ECN threshold decreases by a same level, by different levels, by a same proportion, or by different proportions each time.

Reference ECN configuration information is finally converged ECN configuration information. For example, if the ECN configuration information converges at the ECN configuration information 9, the ECN configuration information 9 is the reference ECN configuration information.

It may be understood that, in a process of determining the reference configuration information based on the network status information, the switch may mark packets by using the ECN configuration information determined in the heuristic learning procedure.

As described above, the switch may send the network status information and the reference ECN configuration information to a network analysis device, so that the network analysis device determines model update information.

By using the heuristic learning procedure in FIG. 7A, FIG. 7B, and FIG. 7C, the switch may send the network status information and the corresponding ECN configuration information that are determined in the heuristic learning procedure to the network analysis device. For example, it is assumed that in a process of using the method shown in FIG. 7A, FIG. 7B, and FIG. 7C, the switch may determine the ECN configuration information 1, the ECN configuration information 2, the ECN configuration information 4, the ECN configuration information 6, the ECN configuration information 7, the ECN configuration information 8, and the ECN configuration information 9 (it is assumed that the heuristic learning procedure finally converges at the ECN configuration information 9), and send the ECN configuration information and the network status information that are shown in Table 1 to the network analysis device.

TABLE 1

| | |
|---|---|
| ECN configuration information 1 | Network status information 1 |
| ECN configuration information 2 | Network status information 2 |
| ECN configuration information 4 | Network status information 4 |
| ECN configuration information 6 | Network status information 6 |
| ECN configuration information 7 | Network status information 7 |
| ECN configuration information 8 | Network status information 8 |
| ECN configuration information 9 | Network status information 9 |

Figure 8:
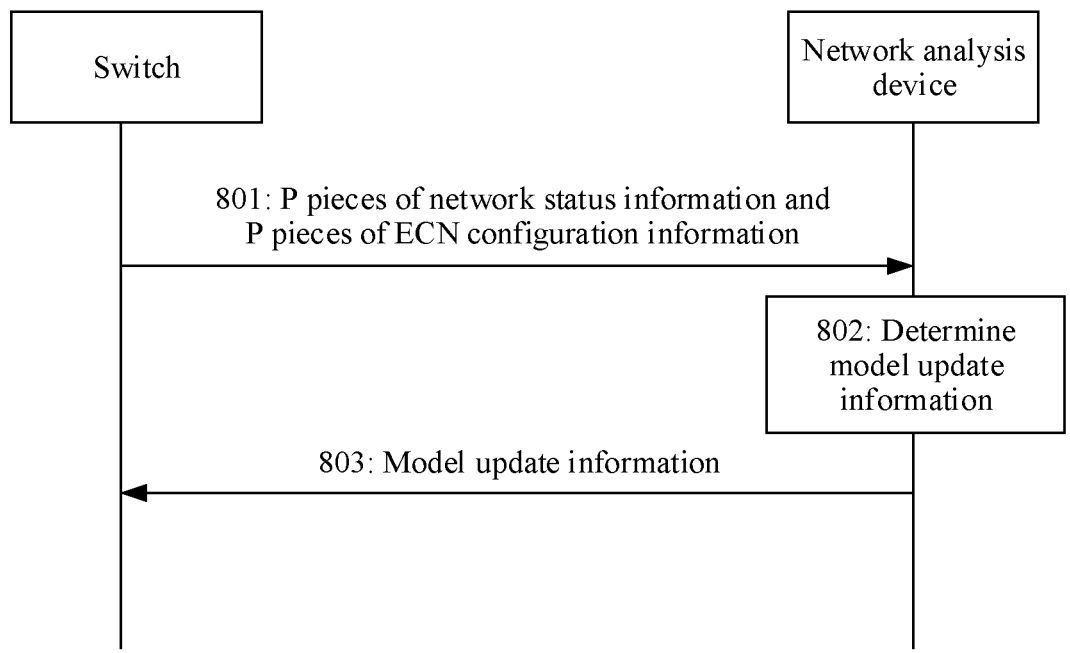
FIG. 8 is a schematic flowchart of a model update method according to an embodiment of this application.

With reference to FIG. 8, the following describes how the network analysis device determines the model update information based on the ECN configuration information and the network status information from the switch.

FIG. 8 is a schematic flowchart of a model update method according to an embodiment of this application.

801: A network analysis device receives P pieces of network status information and P pieces of ECN configuration information from a switch.

Optionally, in some embodiments, for the data center network shown in FIG. 2 or FIG. 3, the network analysis device may be deployed in one of switches at an upper layer of a switch connected to a server. In other words, for the data center network shown in FIG. 2, the network analysis device may be deployed in a switch at the aggregation layer. For the data center network shown in FIG. 3, the network analysis device may be deployed in a switch at the spine layer. For the data center network shown in FIG. 4, the network analysis device may be deployed in one switch.

Optionally, in some other embodiments, the network analysis device may be an independent device, the device is connected to a plurality of switches, and the switch is connected to a server.

Optionally, in some other embodiments, the network analysis device may be deployed in one of a plurality of switches connected to a server.

The P pieces of network status information are in a one-to-one correspondence with the P pieces of ECN configuration information, and P is a positive integer greater than or equal to 2. That the network status information is in a one-to-one correspondence with the ECN configuration information means that the network status information is obtained in a process in which the switch performs ECN marking on packets by using the corresponding ECN configuration information. For example, $p^{th}$ network status information in the P pieces of network status information is obtained in a process in which the switch marks packets by using $p^{th}$ ECN configuration information in the P pieces of ECN configuration information, where p=1, . . . , or P.

802: The network analysis device determines, based on the P pieces of network status information and the P pieces of ECN configuration information, model update information used to update an ECN optimization model.

803: The network analysis device sends the model update information to the switch.

For ease of description, the following refers to the ECN optimization model that has not been updated as a first ECN optimization model, and an updated optimization model as a second ECN optimization model.

Optionally, in some embodiments, the model update information may be a parameter of the second ECN optimization model. In other words, after determining the updated ECN optimization model (namely, the second ECN optimization model), the network analysis device directly sends the second ECN optimization model to the switch. In this case, the switch may directly use the model update information as the parameter of the ECN optimization model. In the foregoing technical solution, because the switch may directly use the model update information as the parameter of the ECN optimization model, load of the switch can be reduced, and the ECN optimization model can be quickly switched to the second ECN optimization model.

Optionally, in some other embodiments, the model update information may be parameters of the second ECN optimization model that are different from those of the first ECN optimization model. In other words, after determining the second ECN optimization model, the network analysis device determines the parameters of the second ECN optimization model that are different from those of the first ECN optimization model, and sends the different parameters to the switch. In this case, the switch may update the first ECN optimization model based on the parameters in the model update information, to obtain the second ECN optimization model. This may reduce a size of the information sent by the network analysis device to the switch, and reduce network load.

Optionally, in some other embodiments, the model update information may directly be determined based on the P pieces of ECN configuration information and the P pieces of network status information. In other words, the network analysis device may not need to determine the second ECN optimization model first, and directly determine the model update information based on the P pieces of ECN configuration information and the P pieces of network status information.

The ECN optimization model is determined through machine learning. Furthermore, the ECN optimization model is determined through supervised learning. Training data used for supervised learning may include a plurality of training parameter groups, and each of the plurality of training parameter groups includes [parameter, label]. A parameter in the training parameter group used to train the ECN optimization model may be the network status information, and a corresponding label is the ECN configuration information corresponding to the network status information.

A machine learning algorithm used to determine the ECN optimization model and/or the model update information may be any one of a decision tree (DT), a random forest (RF), logistic regression (LR), a support vector machine (SVM), a convolutional neural network (CNN), a recurrent neural network (RNN), and the like.

For ease of description, the following assumes that the first ECN optimization model is determined based on a first training parameter group set. The first training parameter group set includes K training parameter groups. Each of the K training parameter groups includes one piece of network status information that is used as a parameter and one piece of ECN configuration information that is used as a parameter, and the ECN configuration information corresponds to the network status information.

Optionally, in some embodiments, the network analysis device may not process the P pieces of network status information and the P pieces of ECN configuration information, and directly use the P pieces of network status information and the P pieces of ECN configuration information as a training parameter group, to determine the model update information.

Optionally, in some embodiments, the switch may determine each of the P pieces of network status information and corresponding ECN configuration information in the P pieces of ECN configuration information as a training parameter group. In other words, the P pieces of network status information and the P pieces of ECN configuration information form P training parameter groups in total. The switch may send the determined P training parameter groups to the network analysis device. In other words, label marking may be implemented by the switch. The P pieces of network status information and the P pieces of ECN configuration information are sent to the switch in a manner of the P training parameter groups.

Optionally, in some other embodiments, label marking may be implemented by the network analysis device. In other words, the switch may directly send the P pieces of network status information and the P pieces of ECN configuration information to the network analysis device. The network analysis device determines each of the P pieces of network status information and corresponding ECN configuration information in the P pieces of ECN configuration information as a training parameter group.

Optionally, in some other embodiments, the network analysis device may determine Q ECN configuration information groups based on the P pieces of ECN configuration information, where a $q^{th}$ ECN configuration information group in the Q ECN configuration information groups includes $N_q$ pieces of ECN configuration information in the P pieces of ECN configuration information, sampling moments corresponding to the $N_q$ pieces of ECN configuration information are consecutive, the $N_q$ pieces of ECN configuration information converge at ECN configuration information q, q=1, ..., or Q, $N_q$ is a positive integer greater than or equal to 2, and a sum from $N_1$ to $N_q$ is P.

The sampling moment corresponding to the ECN configuration information is a moment at which the network status information corresponding to the ECN configuration information is obtained. For example, in the learning procedure shown in FIG. 7A, FIG. 7B, and FIG. 7C, a sampling moment corresponding to the ECN configuration information is t1+T1, and a sampling moment corresponding to the ECN configuration information 2 is t2+T2. Other cases can be deduced by analogy.

In the heuristic learning procedure shown in FIG. 7A, FIG. 7B, and FIG. 7C, the ECN configuration information needs to be adjusted for a plurality of times to converge. A network status of the switch is also stable in a specific time period. Therefore, in a specific time period, the switch may perform ECN marking by using the ECN configuration information converged in the heuristic learning procedure. However, if the network status of the switch changes, the switch may need to start a new heuristic learning procedure, and the ECN configuration information may converge at another result.

Figure 9:
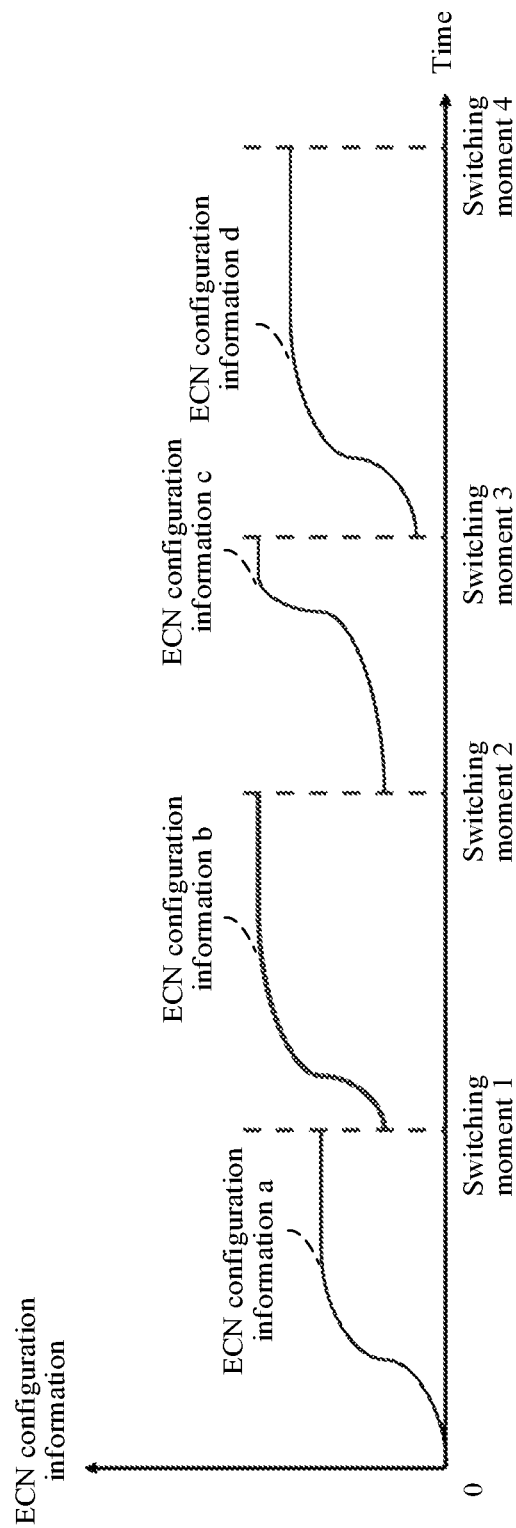
FIG. 9 is a schematic diagram of a convergence process of four heuristic learning procedures.

FIG. 9 is a schematic diagram of a convergence process of four heuristic learning procedures. As shown in FIG. 9, a first heuristic learning procedure in the four heuristic learning procedures finally converges at ECN configuration information a, a second heuristic learning procedure finally converges at ECN configuration information b, a third heuristic learning procedure finally converges at ECN configuration information c, and a fourth heuristic learning procedure finally converges at ECN configuration information d.

The network analysis device may determine the Q ECN configuration information groups by determining a switching moment shown in FIG. 9.

The P pieces of ECN configuration information are in a one-to-one correspondence with P consecutive sampling moments. In this embodiment of this application, in the P consecutive sampling moments, the sampling moments corresponding to the $N_q$ pieces of ECN configuration information are consecutive, and two consecutive sampling moments mean that there is a time sequence between two or more sampling moments. The P consecutive sampling moments are used as an example. A $p'^{th}$ sampling moment in the P consecutive sampling moments is after a $(p'-1)^{th}$ sampling moment, and is before a $(p'+1)^{th}$ sampling moment, where p' is any positive integer greater than or equal to 2 and less than or equal to P–1.

The network analysis device may determine, based on two pieces of ECN configuration information in the P pieces of ECN configuration information, whether a second sampling moment in two consecutive sampling moments is a switching moment, where a first piece of ECN configuration information in the two pieces of ECN configuration information corresponds to a first sampling moment in the two consecutive sampling moments, and a second piece of ECN configuration information corresponds to the second sampling moment. If the second sampling moment is not the switching moment, the two pieces of ECN configuration information belong to a same ECN configuration information group, or if the second sampling moment is the switching moment, the two pieces of ECN configuration information separately belong to two ECN configuration information groups.

Optionally, in some embodiments, that the network analysis device determines, based on two pieces of ECN configuration information in the P pieces of ECN configuration information, whether a second sampling moment in two consecutive sampling moments is a switching moment includes, if $|Param(t)-Param(t-1)|\times Sign(t-t_0-T) \geq$ mean(Param_S)+e×std(Param_S), determining that the second sampling moment is the switching moment, otherwise determining that the second sampling moment is not the switching moment, where T is preset duration, Param(t) indicates the first piece of ECN configuration information, Param(t−1) indicates the second piece of ECN configuration information, to indicates a previous switching moment (an initial value of to is 0), Param_S indicates a sequence of ECN configuration information from the previous switching moment to the second sampling moment, Sign indicates a sign function, mean indicates a mean function, std indicates a standard deviation function, and e indicates a scaling factor. A value of the scaling factor may be 1.5, 2, or 3.

Optionally, in some other embodiments, the network analysis device may determine whether a difference between the two pieces of ECN configuration information exceeds a preset range, and if the difference exceeds the preset range, determine that the second sampling moment is the switching moment, or if the difference does not exceed the preset range, determine that the second sampling moment is not the switching moment.

For example, it is assumed that an upper ECN threshold, a lower ECN threshold, and a maximum ECN marking probability in the first piece of ECN configuration information are respectively Kmax_a, Kmin_a, and Pmax_a, and an upper ECN threshold, a lower ECN threshold, and a maximum ECN marking probability in the second piece of ECN configuration information are respectively Kmax_b, Kmin_b, and Pmax_b.

If an absolute value of a difference between Kmax_a and Kmax_b is greater than a preset threshold a, an absolute value of a difference between Kmin_a and Kmin_b is greater than a preset threshold b, and an absolute value of a difference between Pmax_a and Pmax_b is greater than a preset threshold c, the second sampling moment may be used as the switching moment, otherwise, it is determined that the second sampling moment is not the switching moment.

The foregoing process of determining the switching moment may be referred to as sample data time slicing. The network analysis device may obtain the Q ECN configuration information groups through sample data time slicing. Each of the Q ECN configuration information groups includes network status information in a same heuristic learning procedure. In other words, the Q ECN configuration information groups separately correspond to Q heuristic learning procedures.

For example, it is assumed that seven pieces of network status information shown in Table 1 belong to a first heuristic learning procedure shown in FIG. 9. In this case, the ECN configuration information group corresponding to the first heuristic learning procedure includes seven pieces of network status information shown in Table 1. In addition, as described above, the heuristic learning procedure corresponding to Table 1 finally converges at the ECN configuration information 9. Therefore, the ECN configuration information included in the ECN configuration information group is the ECN configuration information 9. In other words, the ECN configuration information a shown in FIG. 9 is the ECN configuration information 9.

A process before the heuristic learning procedure converges may be referred to as a search process. In the foregoing technical solution, the network analysis device may replace the ECN configuration information corresponding to the network status information in the search process with the finally converged ECN configuration information. Compared with the ECN configuration information in the search process, the converged ECN configuration information is more suitable for a current scenario. Therefore, the converged ECN configuration information is used as a label, to improve quality of the training parameter group. The foregoing process of updating the label of the network status information in the search process from the ECN configuration information corresponding to the network status information to the converged ECN configuration information may be referred to as sample data label correction.

The network status information and the ECN configuration information shown in Table
are further used as an example. As described above, the ECN configuration information shown in Table 1 finally converges at the ECN configuration information 9. Therefore, a training parameter group obtained through sample data label correction is shown in Table 2.

TABLE 2

| ECN configuration information 9 | Network status information 1 |
|---|---|
| ECN configuration information 9 | Network status information 2 |
| ECN configuration information 9 | Network status information 4 |
| ECN configuration information 9 | Network status information 6 |
| ECN configuration information 9 | Network status information 7 |
| ECN configuration information 9 | Network status information 8 |
| ECN configuration information 9 | Network status information 9 |

Each row shown in Table 2 indicates one training parameter group. Table 2 shows seven training parameter groups in total, and labels of the seven training parameter groups are the ECN configuration information 9.

After sample data label correction, the network analysis device may further store a corrected training parameter group, and determine the model update information based on the corrected training parameter group.

It may be understood that FIG. 8 only shows a process in which the network analysis device updates the ECN optimization model based on the network status information and the ECN configuration information from one switch. In some implementations, the network analysis device may receive network status information and ECN configuration information from a plurality of switches, and determine model update information based on the network status information and the ECN configuration information from the plurality of switches.

Figure 10:
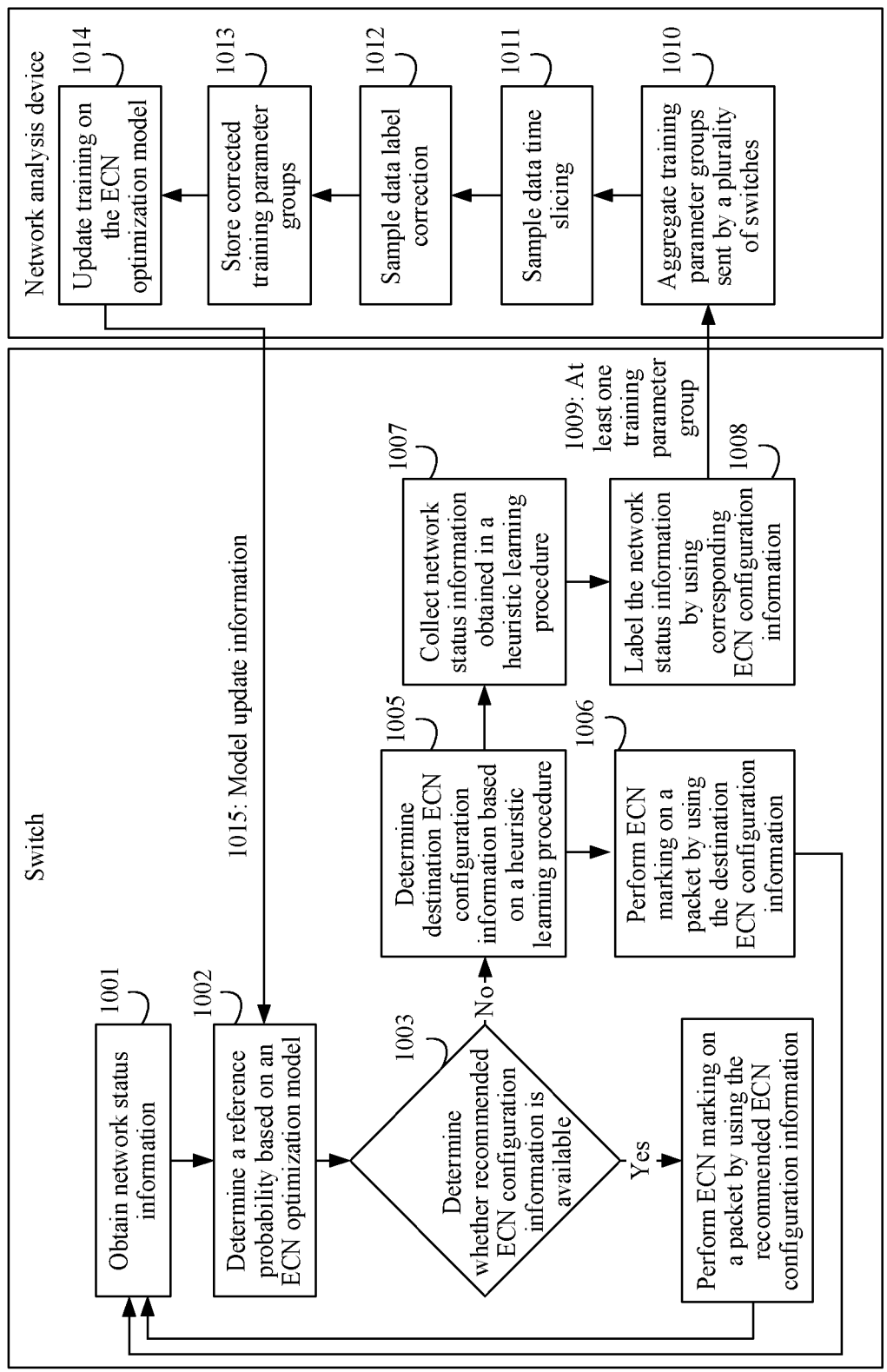
FIG. 10 is a schematic flowchart of a network congestion handling method according to an embodiment of this application.

FIG. 10 is a schematic flowchart of a network congestion handling method according to an embodiment of this application.

1001: A switch obtains network status information.

1002: The switch determines, based on the network status information and an ECN optimization model, a reference probability corresponding to recommended ECN configuration information.

1003: The switch determines whether the recommended ECN configuration information is available.

If the recommended ECN configuration information is available, step 1004 is performed.

If the recommended ECN configuration information is not available, step 1005 is performed.

1004: The switch performs ECN marking on packets by using the recommended ECN configuration information.

After performing step 1004, the switch continues to perform step 1001, and enters a next cycle of iteration.

1005: The switch determines destination ECN configuration information based on a heuristic learning procedure.

1006: The switch performs ECN marking on packets by using the destination ECN configuration information.

After performing step 1006, the switch continues to perform step 1001, and enters a next cycle of iteration.

In addition, the switch may further perform the following steps in the heuristic learning procedure.

1007: The switch collects the network status information obtained in the heuristic learning procedure.

1008: The switch performs labeling the network status information by using corresponding ECN configuration information, to obtain at least one training parameter group.

1009: The switch sends the at least one training parameter group to a network analysis device.

After receiving the at least one training parameter group, the network analysis device may perform the following steps.

1010: The network analysis device aggregates training parameter groups sent by a plurality of switches.

1011: The network analysis device performs sample data time slicing.

1012: The network analysis device performs sample data label correction.

1013: The network analysis device stores corrected training parameter groups.

1014: The network analysis device performs update training on the ECN optimization model, to obtain model update information.

1015: The network analysis device sends the model update information to the switch. Correspondingly, the switch receives the model update information from the network analysis device. The switch updates the ECN optimization model by using the model update information. In a next cycle of iteration, the switch determines recommended ECN configuration information and a reference probability based on an updated ECN optimization model.

For specific implementations of steps in FIG. 10, refer to methods in FIG. 6 to FIG. 8. For brevity, details are not described herein again.

FIG. 5 to FIG. 10 describe the technical solutions of this application by using a switch supporting an ECN technology as an example. It may be understood that the technical solutions in the embodiments of this application may be applied to another type of network device that can perform flow control by using the ECN technology, for example, a server.

Figure 11:
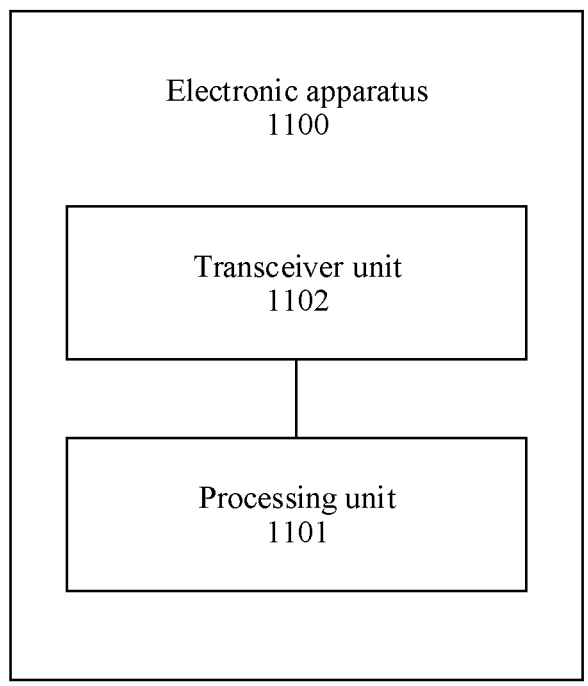
FIG. 11 is a schematic block diagram of a structure of an electronic apparatus according to an embodiment of this application.

FIG. 11 is a schematic block diagram of a structure of an electronic apparatus according to an embodiment of this application. As shown in FIG. 11, an electronic apparatus 1120 includes a processing unit 1101 and a transceiver unit 1102. The electronic apparatus 1120 may perform steps performed by the switch in the method shown in FIG. 6 or FIG. 7A, FIG. 7B, and FIG. 7C, or the method shown in FIG. 8 or FIG. 10. The electronic apparatus 1120 may be a network device (for example, a switch), or may be a chip.

The processing unit 1101 is configured to obtain network status information.

The processing unit 1101 is further configured to determine, based on the network status information and an ECN optimization model, a reference probability corresponding to recommended ECN configuration information.

The processing unit 1101 is further configured to determine destination ECN configuration information based on the reference probability.

The processing unit 1101 is further configured to perform ECN marking on packets by using the destination ECN configuration information.

The transceiver unit 1102 is configured to send the packet.

Optionally, the processing unit 1101 is further configured to determine whether the recommended ECN configuration information is trustworthy based on the reference probability, and if the recommended ECN configuration information is trustworthy, determine that the recommended ECN configuration information is the destination ECN configuration information, or if the recommended ECN configuration information is not trustworthy, determine that reference ECN configuration information is the destination ECN configuration information.

Optionally, the processing unit 1101 is further configured to determine the reference ECN configuration information based on the network status information.

Optionally, the transceiver unit 1102 is further configured to send the network status information and the reference ECN configuration information to a network analysis device and receive model update information from the network analysis device. The processing unit 1101 is further configured to update the ECN optimization model based on the model update information.

Optionally, the reference probability includes M probability values, and M is a positive integer greater than or equal to 2. The processing unit 1101 is further configured to determine whether a target probability value in the M probability values is greater than a first preset threshold, where the target probability value is a maximum value in the M probability values, and if the target probability value is greater than or equal to the first preset threshold, determine that the recommended ECN configuration information is trustworthy, or if the target probability value is less than the first preset threshold, determine that the recommended ECN configuration information is not trustworthy.

Optionally, the reference probability includes M probability values, and the processing unit 1101 is further configured to determine whether a fluctuation coefficient of maximum N probability values in the M probability values is greater than a second preset threshold, where N is a positive integer greater than or equal to 2 and less than M, and M is a positive integer greater than N, and if the fluctuation coefficient of the N probability values is greater than or equal to the second preset threshold, determine that the recommended ECN configuration information is trustworthy, or if the fluctuation coefficient of the N probability values is less than the second preset threshold, determine that the recommended ECN configuration information is not trustworthy. The fluctuation coefficient of the N probability values is determined according to the following formula:

$$P_N = \frac{std(P_{topN})}{\text{mean}(P_{topN})},$$

where $P_N$ indicates the fluctuation coefficient of the N probability values, $P_{topN}$ indicates the N probability values, mean indicates a mean function, and std indicates a standard deviation function.

Optionally, the network status information includes network traffic information and network congestion information, the network traffic information is used to indicate traffic of the electronic apparatus, and the network congestion information is used to indicate a congestion status of the electronic apparatus.

If the electronic apparatus 1120 is a network device, the transceiver unit 1102 may be a transceiver unit of the network device, and the processing unit 1101 may be a processing unit of the network device. The transceiver unit 1102 may also be referred to as a transceiver, a transceiver apparatus, or the like. The processing unit 1101 may also be referred to as a processor, a processing board, a processing module, a processing apparatus, or the like. Optionally, a component that is in the transceiver unit 1102 and that is configured to implement a receiving function may be considered as a receiving unit, and a component that is in the transceiver unit 1102 and that is configured to implement a sending function may be considered as a sending unit. In other words, the transceiver unit 1102 includes a receiving unit and a sending unit. The transceiver unit may also be sometimes referred to as a transceiver, a transceiver circuit, or the like. The receiving unit may also be sometimes referred to as a receiver, a receiving circuit, or the like. The sending unit may also be sometimes referred to as a transmitter, a transmitter circuit, or the like.

If the electronic apparatus 1120 is a chip, the transceiver unit 1102 may be an input/output circuit or a communication interface, and the processing unit 1101 may be a processor or a circuit integrated on the chip.

It should be understood that FIG. 11 is merely an example rather than a limitation, and the network device including the transceiver unit 1102 and the processing unit 1101 may not depend on the structure shown in FIG. 11.

For specific functions of the transceiver unit 1102 and the processing unit 1101, refer to methods shown in FIG. 6 to FIG. 8.

Figure 12:
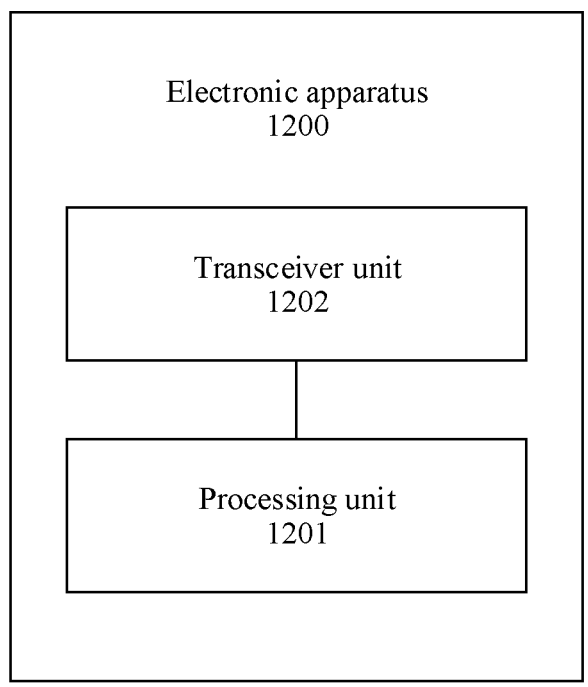
FIG. 12 is a schematic block diagram of a structure of another electronic apparatus according to an embodiment of this application.

FIG. 12 is a schematic block diagram of a structure of another electronic apparatus according to an embodiment of this application. As shown in FIG. 12, an electronic apparatus 1200 includes a processing unit 1201 and a transceiver unit 1202. The electronic apparatus 1200 may perform steps performed by the switch in the method shown in FIG. 7A, FIG. 7B, and FIG. 7C. The electronic apparatus 1200 may be a network device (for example, a switch), or may be a chip.

The transceiver unit 1202 is configured to receive P pieces of network status information and P pieces of ECN configuration information from a network device, where the P pieces of network status information are in a one-to-one correspondence with the P pieces of ECN configuration information, and P is a positive integer greater than or equal to 2.

The processing unit 1201 is configured to determine, based on the P pieces of network status information and the P pieces of ECN configuration information, model update information used to update an ECN optimization model.

The transceiver unit 1202 is further configured to send the model update information to the network device.

Optionally, the processing unit 1201 is further configured to determine Q ECN configuration information groups based on the P pieces of ECN configuration information, where a C0 ECN configuration information group in the Q ECN configuration information groups includes $N_q$ pieces of ECN configuration information in the P pieces of ECN configuration information, sampling moments corresponding to the $N_q$ pieces of ECN configuration information are consecutive, the $N_q$ pieces of ECN configuration information converge at ECN configuration information q, q=1, . . . , or Q, $N_q$ is a positive integer greater than or equal to 2, and a sum from $N_1$ to $N_q$ is P, determine Q training parameter groups, where a C0 training parameter group in the Q training parameter groups includes $N_q$ pieces of network status information and the ECN configuration information q, and the $N_q$ pieces of network status information are in a one-to-one correspondence with the $N_q$ pieces of ECN configuration information, and determine the model update information based on the Q training parameter groups.

Optionally, the P pieces of ECN configuration information are in a one-to-one correspondence with P consecutive sampling moments, and the processing unit 1201 is further configured to determine, based on two pieces of ECN configuration information in the P pieces of ECN configuration information, whether a second sampling moment in two consecutive sampling moments is a switching moment, where a first piece of ECN configuration information in the two pieces of ECN configuration information corresponds to a first sampling moment in the two consecutive sampling moments, and a second piece of ECN configuration information corresponds to the second sampling moment, and if the second sampling moment is not the switching moment, determine that the two pieces of ECN configuration information belong to a same ECN configuration information group, or if the second sampling moment is the switching moment, determine that the two pieces of ECN configuration information separately belong to two ECN configuration information groups.

Optionally, the processing unit 1201 is further configured to, if $|Param(t)-Param(t-1)| \times Sign(t-t_0-T) \geq mean(Param\_S)+e \times std(Param\_S)$, determine that the second sampling moment is the switching moment, otherwise determine that the second sampling moment is not the switching moment, where T is preset duration, Param(t) indicates the first piece of ECN configuration information, Param(t−1) indicates the second piece of ECN configuration information, to indicates a previous switching moment, Param_S indicates a sequence of ECN configuration information from the previous switching moment to the second sampling moment, Sign indicates a sign function, mean indicates a mean function, std indicates a standard deviation function, and e indicates a scaling factor.

If the electronic apparatus 1200 is a network analysis device, the transceiver unit 1202 may be a transceiver unit of the network analysis device, and the processing unit 1201 may be a processing unit of the network analysis device. The transceiver unit 1202 may also be referred to as a transceiver, a transceiver apparatus, or the like. The processing unit 1201 may also be referred to as a processor, a processing board, a processing module, a processing apparatus, or the like. Optionally, a component that is in the transceiver unit 1202 and that is configured to implement a receiving function may be considered as a receiving unit, and a component that is in the transceiver unit 1202 and that is configured to implement a sending function may be considered as a sending unit. In other words, the transceiver unit 1202 includes a receiving unit and a sending unit. The transceiver unit may also be sometimes referred to as a transceiver, a transceiver circuit, or the like. The receiving unit may also be sometimes referred to as a receiver, a receiving circuit, or the like. The sending unit may also be sometimes referred to as a transmitter, a transmitter circuit, or the like.

If the electronic apparatus 1200 is a chip, the transceiver unit 1202 may be an input/output circuit or a communication interface, and the processing unit 1201 may be a processor or a circuit integrated on the chip.

It should be understood that FIG. 12 is merely an example rather than a limitation, and the network analysis device including the transceiver unit 1202 and the processing unit 1201 may not depend on the structure shown in FIG. 12.

For specific functions of the transceiver unit 1202 and the processing unit 1201, refer to the method shown in FIG. 7A, FIG. 7B, and FIG. 7C.

An embodiment of this application further provides a processing apparatus, including a processor and an interface. The processor may be configured to perform the method in the foregoing method embodiment.

It should be understood that the processing apparatus may be a chip. For example, the processing apparatus may be a field-programmable gate array (FPGA), an application-specific integrated circuit (ASIC), a system on chip (SoC), a central processing unit (CPU), a network processor (NP), a digital signal processor (DSP), a microcontroller unit (MCU), a programmable logic device (PLD), another PLD, a discrete gate or a transistor logic device, a discrete hardware component, or another integrated chip.

In an implementation process, the steps of the foregoing methods may be completed by using a hardware integrated logic circuit, an instruction in a form of software, or program code in the processor. The steps of the methods disclosed with reference to the embodiments of this application may be directly performed and completed by a hardware processor, or may be performed and completed by using a combination of hardware and software modules in the processor. The software module may be located in a mature storage medium in the art, such as a random-access memory (RAM), a flash memory, a read-only memory (ROM), a programmable ROM (PROM), an electrically erasable PROM (EEPROM), or a register. The storage medium is located in the memory, and the processor reads information in the memory and completes the steps in the foregoing methods in combination with hardware of the processor. To avoid repetition, details are not described herein again.

It should be noted that the processor in the embodiments of this application may be an integrated circuit chip, and has a signal processing capability. In an implementation process, the steps of the foregoing method embodiments may be completed by using a hardware integrated logic circuit, an instruction in a form of software, or program code in the processor. A general-purpose processor may be a microprocessor, or the processor may be any conventional processor or the like. The steps of the methods disclosed with reference to the embodiments of this application may be directly performed and completed by a hardware decoding processor, or may be performed and completed by using a combination of hardware and software modules in the decoding processor. The software module may be located in a mature storage medium in the art, such as a RAM, a flash memory, a ROM, a PROM, an EEPROM, or a register. The storage medium is located in the memory, and the processor reads information in the memory and completes the steps in the foregoing methods in combination with hardware of the processor.

It may be understood that the memory in this embodiment of this application may be a volatile memory or a nonvolatile memory, or may include both a volatile memory and a nonvolatile memory. The nonvolatile memory may be a ROM, a PROM, an erasable PROM (EPROM), an EEPROM, or a flash memory. The volatile memory may be a RAM, used as an external cache. By way of example but not limitative description, many forms of RAMs may be used, for example, a static RAM (SRAM), a dynamic RAM (DRAM), a synchronous DRAM (SDRAM), a double data rate (DDR) SDRAM, an enhanced synchronous DRAM (ESDRAM), a synchlink DRAM (SLDRAM), and a direct rambus (DR) RANI. It should be noted that the memories in the systems and methods described in this specification include but are not limited to these memories and any memory of another suitable type.

According to the method provided in the embodiments of this application, this application further provides a computer program product. The computer program product includes computer program code. When the computer program code is run on a computer, the computer is enabled to perform the method in any one of embodiments shown in FIG. 5 to FIG. 8 and FIG. 10.

According to the method provided in the embodiments of this application, this application further provides a computer-readable medium. The computer-readable medium stores program code. When the program code is run on a computer, the computer is enabled to perform the method in any one of embodiments shown in FIG. 5 to FIG. 8 and FIG. 10.

According to the method provided in the embodiments of this application, this application further provides a system, including the foregoing network analysis device and one or more network devices.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

The units described as separate parts may or may not be physically separate, and parts displayed as units may or may not be physical units, and may be located in one position, or may be distributed on a plurality of network units. Some or all of the units may be selected based on actual requirements to achieve objectives of the solutions of the embodiments.

In addition, functional units in the embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in the form of a software product. The computer software product is stored in a storage medium and includes several instructions or program code for instructing a computer device (which may be a personal computer, a server, or a network device) to perform all or some of the steps of the methods described in the embodiments of this application. The foregoing storage medium includes various media that can store program code, such as a Universal Serial Bus (USB) flash drive, a removable hard disk drive, a ROM, a RANI, a magnetic disk, and an optical disc.

The foregoing description is merely specific implementations of this application, but the protection scope of this application is not limited thereto. Any variation or replacement that can be readily figured out by a person skilled in the art within the technical scope disclosed in this application shall fall within the protection scope of this application. Therefore, the protection scope of this application shall be subject to the protection scope of the claims.

What is claimed is:

1. A method, comprising:
obtaining network status information comprising:
network traffic information indicating traffic of a network device; and
network congestion information indicating a congestion status of the network device; and
performing, using destination Explicit Congestion Notification (ECN) configuration information, marking on a packet,
wherein the destination ECN configuration information is based on a reference probability corresponding to recommended ECN configuration information, and
wherein the reference probability is based on the network status information and an ECN optimization model.

2. The method of claim 1, wherein the recommended ECN configuration information is the destination ECN configuration information when the recommended ECN configuration information is trustworthy, wherein reference ECN configuration information is the destination ECN configuration information when the recommended ECN configuration information is not trustworthy, wherein the reference probability comprises M probability values, wherein M is a positive integer greater than or equal to 2, wherein a target probability value is a maximum value in the M probability values, wherein the recommended ECN configuration information is trustworthy when the target probability value is greater than or equal to a first preset threshold, and wherein the recommended ECN configuration information is not trustworthy when the target probability value is less than the first preset threshold.

3. The method of claim 2, wherein the reference ECN configuration information is based on the network status information.

4. The method of claim 3, further comprising:
sending, to a network analysis device, the network status information and the reference ECN configuration information;
receiving, from the network analysis device, model update information; and
updating, based on the model update information, the ECN optimization model.

5. The method of claim 1, wherein the recommended ECN configuration information is the destination ECN configuration information when the recommended ECN configuration information is trustworthy, wherein reference ECN configuration information is the destination ECN configuration information when the recommended ECN configuration is not trustworthy, wherein the recommended ECN configuration information is trustworthy when a fluctuation coefficient of a maximum N probability values in M probability values is greater than or equal to a second preset threshold, wherein the recommended ECN configuration information is not trustworthy when the fluctuation coefficient is less than the second preset threshold, wherein the reference probability comprises the M probability values, wherein N is a positive integer greater than or equal to 2 and less than M, wherein M is a positive integer greater than N, wherein the fluctuation coefficient is based on a formula, wherein the formula is:

$$P_N = \frac{std(P_{topN})}{mean(P_{topN})},$$

wherein $P_N$ indicates the fluctuation coefficient, wherein $P_{topN}$ indicates the N probability values, wherein mean indicates a mean function, and wherein std indicates a standard deviation function.

6. A device, comprising:
a processor; and
a memory coupled to the processor and configured to store instructions that when executed by the processor, cause the device to:
obtain network status information comprising:
network traffic information indicating traffic of a network device; and
network congestion information indicating a congestion status of the network device;
perform, using destination Explicit Congestion Notification (ECN) configuration information, marking on a packet, wherein the destination ECN configuration information is based on a reference probability corresponding to recommended ECN configuration information, and wherein the reference probability is based on the network status information and an ECN optimization model; and
send the packet.

7. The device of claim 6, wherein the recommended ECN configuration information is the destination ECN configuration information when the recommended ECN configuration information is trustworthy, wherein reference ECN configuration information is the destination ECN configuration information when the recommended ECN configuration information is not trustworthy, wherein the reference probability comprises M probability values, wherein M is a positive integer greater than or equal to 2, wherein a target probability value is a maximum value in the M probability values, wherein the recommended ECN configuration information is trustworthy when the target probability value is greater than or equal to a first preset threshold, and wherein the recommended ECN configuration information is not trustworthy when the target probability value is less than the first preset threshold.

8. The device of claim 7, wherein the reference ECN configuration information is based on the network status information.

9. The device of claim 8, wherein when executed by the processor, the instructions further cause the device to:
send, to a network analysis device, the network status information and the reference ECN configuration information;
receive, from the network analysis device, model update information; and
update, based on the model update information, the ECN optimization model.

10. The device of claim 6, wherein the recommended ECN configuration information is the destination ECN configuration information when the recommended ECN configuration information is trustworthy, wherein reference ECN configuration information is the destination ECN configuration information when the recommended ECN configuration is not trustworthy, wherein the recommended ECN configuration information is trustworthy when a fluctuation coefficient of a maximum N probability values in M probability values is greater than or equal to a second preset threshold, wherein the recommended ECN configuration information is not trustworthy when the fluctuation coefficient is less than the second preset threshold, wherein the reference probability comprises the M probability values, wherein N is a positive integer greater than or equal to 2 and less than M, wherein M is a positive integer greater than N, wherein the fluctuation coefficient of the N probability values is based on a formula, wherein the formula is:

$$P_N = \frac{std(P_{topN})}{mean(P_{topN})},$$

wherein $P_N$ indicates the fluctuation coefficient, wherein $P_{topN}$ indicates the N probability values, wherein mean indicates a mean function, and wherein std indicates a standard deviation function.

11. A chip system comprising:
a logic circuit coupled to an input/output interface and configured to:
obtain network status information comprising:
network traffic information indicating traffic of a network device; and
network congestion information indicating a congestion status of the network device;
perform, using destination Explicit Congestion Notification (ECN) configuration information, marking on a packet, wherein the destination ECN configuration information is based on a reference probability corresponding to recommended ECN configuration information, and wherein the reference probability is based on the network status information and an ECN optimization model; and
send the packet.

12. The chip system of claim 11, wherein the recommended ECN configuration information is the destination ECN configuration information when the recommended ECN configuration information is trustworthy, wherein reference ECN configuration information is the destination ECN configuration information when the recommended ECN configuration information is not trustworthy, wherein the reference probability comprises M probability values, wherein M is a positive integer greater than or equal to 2, wherein a target probability value is a maximum value in the M probability values, wherein the recommended ECN configuration information is trustworthy when the target probability value is greater than or equal to a first preset threshold, and wherein the recommended ECN configuration information is not trustworthy when the target probability value is less than the first preset threshold.

13. The chip system of claim 12, wherein the reference ECN configuration information is based on the network status information.

14. The chip system of claim 13, wherein the logic circuit is further configured to:

send, to a network analysis device, the network status information and the reference ECN configuration information;
receive, from the network analysis device, model update information; and
update, based on the model update information, the ECN optimization model.

15. The chip system of claim 11, wherein the recommended ECN configuration information is the destination ECN configuration information when the recommended ECN configuration information is trustworthy, wherein reference ECN configuration information is the destination ECN configuration information when the recommended ECN configuration is not trustworthy, wherein the recommended ECN configuration information is trustworthy when a fluctuation coefficient of a maximum N probability values in M probability values is greater than or equal to a second preset threshold, wherein the recommended ECN configuration information is not trustworthy when the fluctuation coefficient is less than the second preset threshold, wherein the reference probability comprises the M probability values, wherein N is a positive integer greater than or equal to 2 and less than M, wherein M is a positive integer greater than N, wherein the fluctuation coefficient is based on a formula, wherein the formula is:

$$P_N = \frac{std(P_{topN})}{mean(P_{topN})},$$

wherein $P_N$ indicates the fluctuation coefficient of the N probability values, wherein $P_{topN}$ indicates the N probability values, wherein mean indicates a mean function, and wherein std indicates a standard deviation function.

16. The method of claim 1, wherein performing the marking on the packet comprises adding an ECN mark to an Internet Protocol (IP) header of the packet.

17. The method of claim 1, wherein the packet is configured to instruct the network device to reduce a packet sending rate.

18. The device of claim 6, wherein performing the marking on the packet comprises adding an ECN mark to an Internet Protocol (IP) header of the packet.

19. The device of claim 6, wherein the packet is configured to instruct the network device to reduce a packet sending rate.

20. The chip system of claim 11, wherein performing the marking on the packet comprises adding an ECN mark to an Internet Protocol (IP) header of the packet, and wherein the packet is configured to instruct the network device to reduce a packet sending rate.

* * * * *